(12) United States Patent
Nader et al.

(10) Patent No.: US 11,477,812 B2
(45) Date of Patent: Oct. 18, 2022

(54) TRANSMISSION AND RECEPTION OF A DATA BLOCK IN A WIRELESS COMMUNICATION SYSTEM

(71) Applicant: Telefonaktiebolaget LM Ericsson (publ), Stockholm (SE)

(72) Inventors: Ali Nader, Malmö (SE); Andreas Höglund, Solna (SE); Béla Rathonyi, Lomma (SE); Yi-Pin Eric Wang, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 67 days.

(21) Appl. No.: 16/983,023

(22) Filed: Aug. 3, 2020

(65) Prior Publication Data

US 2020/0367270 A1 Nov. 19, 2020

Related U.S. Application Data

(63) Continuation of application No. 16/239,078, filed on Jan. 3, 2019, now Pat. No. 10,743,334, which is a
(Continued)

(51) Int. Cl.
*H04W 72/12* (2009.01)
*H04L 1/18* (2006.01)

(52) U.S. Cl.
CPC ......... *H04W 72/1273* (2013.01); *H04L 1/189* (2013.01); *H04L 1/1887* (2013.01);
(Continued)

(58) Field of Classification Search
CPC ............... H04W 72/1273; H04W 72/1268
See application file for complete search history.

(56) References Cited

U.S. PATENT DOCUMENTS

| 8,971,181 | B2 | 3/2015 | Gholmieh et al. |
| 2005/0083873 | A1* | 4/2005 | Yamamoto ............. H04L 47/10 370/328 |

(Continued)

FOREIGN PATENT DOCUMENTS

| CN | 101388756 A | 3/2009 |
| CN | 102860111 A | 1/2013 |

(Continued)

OTHER PUBLICATIONS

"Considerations on Frequency Tracking for NB-IOT", 3GPP TSG RAN WG1 Meeting #83; R1-156980; Anaheim, USA, Nov. 15-22, 2015, 1-3.

(Continued)

*Primary Examiner* — Luat Phung
(74) *Attorney, Agent, or Firm* — Murphy, Bilak & Homiller, PLLC

(57) ABSTRACT

A user equipment is configured for use in a wireless communication system. The user equipment in particular is configured to receive from a base station one or more configuration messages that indicate a pattern of downlink transmission gaps in time. The user equipment is further configured to receive from the base station a scheduled downlink transmission that comprises a downlink data block and one or more repetitions of the downlink data block. The scheduled downlink transmission is received with downlink transmission gaps therein according to the indicated pattern. Alternatively or additionally, the user equipment is configured to transmit a scheduled uplink transmission that comprises an uplink data block and one or more repetitions of the uplink data block. In this case, the scheduled uplink transmission is transmitted with uplink transmission gaps therein according to an uplink transmission gap pattern that specifies a pattern of uplink transmission gaps in time.

18 Claims, 14 Drawing Sheets

Related U.S. Application Data continuation of application No. 15/402,293, filed on Jan. 10, 2017, now Pat. No. 10,178,690.

(60) Provisional application No. 62/277,465.

(52) U.S. Cl.
  CPC .......... *H04L 1/1896* (2013.01); *H04W 72/12* (2013.01); *H04W 72/1268* (2013.01)

(56) References Cited

U.S. PATENT DOCUMENTS

| | | | | |
|---|---|---|---|---|
| 2008/0102880 A1* | 5/2008 | Gholmieh | ............. | H04W 52/44 455/552.1 |
| 2009/0111383 A1* | 4/2009 | Eckert | ................... | H04W 24/02 455/67.11 |
| 2010/0309803 A1* | 12/2010 | Toh | ................... | H04W 36/0088 370/252 |
| 2012/0135696 A1* | 5/2012 | Lerzer | ............... | H04W 52/0296 455/127.1 |
| 2013/0201864 A1* | 8/2013 | Acharya | ........... | H04W 72/0446 370/253 |
| 2015/0016312 A1 | 1/2015 | Li et al. | | |
| 2015/0031576 A1 | 1/2015 | Rakhmanaliev | | |
| 2015/0131576 A1 | 5/2015 | Seo et al. | | |
| 2015/0245235 A1* | 8/2015 | Tang | ................. | H04W 36/0011 370/252 |
| 2015/0264662 A1 | 9/2015 | Sahlin et al. | | |
| 2015/0373598 A1 | 12/2015 | Tsuboi et al. | | |
| 2016/0128058 A1 | 5/2016 | Kulal | | |
| 2016/0204823 A1* | 7/2016 | Lovberg | ................... | H04B 1/40 375/219 |
| 2016/0338110 A1 | 11/2016 | Wang et al. | | |
| 2017/0094644 A1 | 3/2017 | Vos | | |
| 2018/0132251 A1* | 5/2018 | Sun | ................... | H04W 72/0446 |

FOREIGN PATENT DOCUMENTS

| | | |
|---|---|---|
| CN | 104115436 A | 10/2014 |
| CN | 105099629 A | 11/2015 |
| JP | 2002509676 A | 3/2002 |
| RU | 2392749 C2 | 6/2010 |
| RU | 2479945 C2 | 4/2013 |
| RU | 2495546 C2 | 10/2013 |
| WO | 9956474 A2 | 11/1999 |
| WO | 2011008648 A2 | 1/2011 |
| WO | 2014115734 A1 | 7/2014 |
| WO | 2015095564 A1 | 6/2015 |
| WO | 2015103952 A1 | 7/2015 |
| WO | 2015113214 A1 | 8/2015 |

OTHER PUBLICATIONS

"Measurement Gap Configuration and Measurement for MTC UEs", 3GPP TSG RAN WG1 Meeting #82; R1-154230; Beijing, China, Aug. 24-28, 2015, 1-3.

"On Coverage Level, Coverage Enhancement J\;fode & Repetition Level in LC-MTC", 3GPP TSG RAN WG1 Meeting #82bis; R1-155609; Malmö, Sweden, Oct. 5-9, 2015, 1-3.

"PDSCH/PUSCH repetition level indication", 3GPP TSG-RAN WG1 Meeting #83; R1-156640; Anaheim, USA, Nov. 15-22, 2015, 1-3.

Bergman, J., "Further LTE Physical Layer Enhancements for MTC", 3GPP TSG RAN meeting #70; Sifges, Spain, RP-152259, Dec. 7-10, 2015, 1-48.

Unknown, Author, "Corrections on DL Gap on NPDSCH TS 36.211", 3GPP TSG RAN WG1 Meeting #86; R1-167782; Gothenburg, Sweden, Aug. 22-27, 2016, pp. 1-2.

Unknown, Author, "NB-IoT—Design Considerations for NB-POSCH", 3GPP TSG-RAN1 NB-IOT Ad Hoc; R1-160076; Budapest, Hungary, Jan. 18-20, 2016, pp. 1-6.

Unknown, Author, "Remaining PDSCH Issues for MTC", 3GPP TSG-RAN WG1 Meeting #82; R1-153833; Beijing, China, Aug. 24-28, 2015, pp. 1-3.

Unknown, Author, "Time discontinuous transmission for NB-IoT", 3GPP TSG-RAN WG1 NB-IoT Adhoc; R1-160016; Budapest, Hungary,, Jan. 18-20, 2016, pp. 1-3.

Unknown, Author, "WF on DL Transmission Gap for NB-IoT", 3GPP TSG RAN WG1 NB-IoT Ad-Hoc Meeting; R1-162030; Sophia-Antipolis, France, Mar. 22-24, 2016, pp. 1-3.

\* cited by examiner

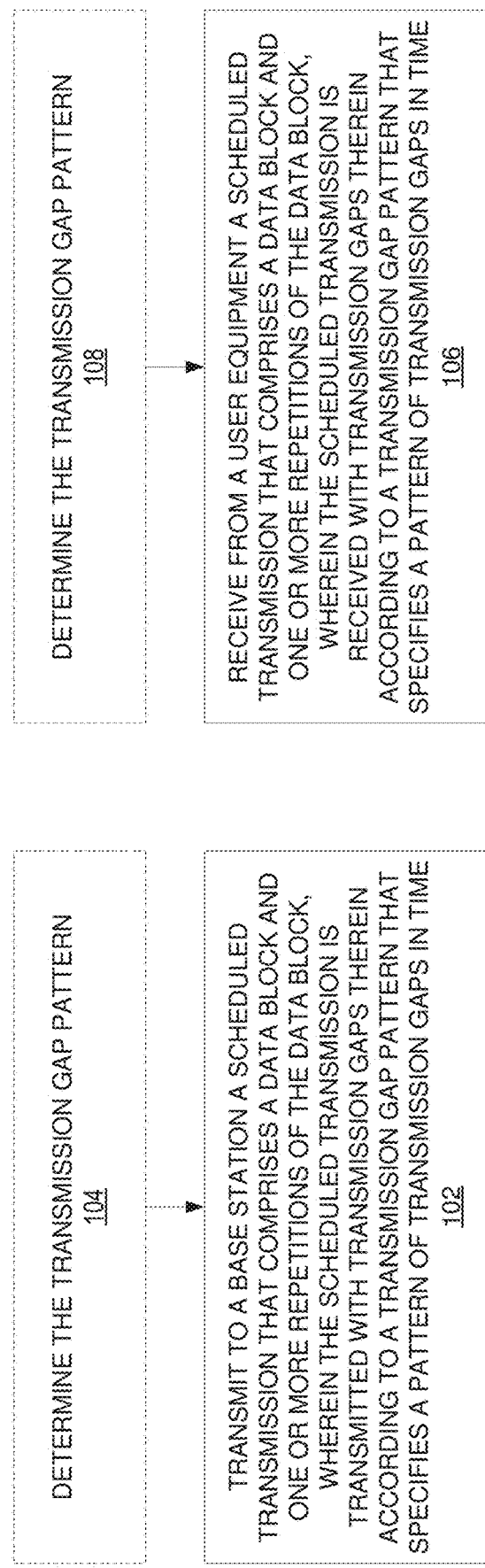

TRANSMISSION AND RECEPTION OF A DATA BLOCK IN A WIRELESS COMMUNICATION SYSTEM

RELATED APPLICATIONS

This application is a continuation of U.S. application Ser. No. 16/239,078, filed on Jan. 3, 2019, which is a continuation of U.S. application Ser. No. 15/402,293, filed on Jan. 10, 2017, which claims the benefit of U.S. Provisional Application No. 62/277,465, filed on 11 Jan. 2016, each of which is incorporated by reference herein.

TECHNICAL FIELD

The present invention generally relates to a wireless communication system, and particularly relates to transmission and reception of a data block in a wireless communication system.

BACKGROUND

Currently, the 3rd generation partnership project (3GPP) is standardizing a feature called Narrowband Internet of Things (NB-IoT) for satisfying the requirements of Machine Type Communication (MTC) applications, while maintaining backward compatibility with the current Long Term Evolution (LTE) radio access technology. NB-IoT transmissions may occur in-band of a wideband LTE transmission, within a guard band of a wideband LTE transmission, or in standalone spectrum. Regardless, communication of control information and payload data in a NB-IoT environment proves challenging because it may be necessary for NB-IoT devices to operate in environments that exhibit very low signal to noise ratios (SNRs).

To support wireless communication in such environment, each NB-IoT base station (eNB) and user equipment (UE) may be configured to repeat transmission of control and data blocks (e.g., transport blocks or other subsets of packet data) to one or more destination NB-IoT devices in both the uplink (UL) and downlink (DL). On the receiving side, data from each repetition is soft-combined before decoding. The number of repetitions will be configured per UE (and further varies per physical channel).

Link simulations show that up to 24 repetitions might be necessary to achieve the targeted gain (up to 164 dB coupling loss) for some channels. Note that repetition is done per packet spanning over several one-millisecond (ms) transmission time intervals (TTIs). For instance, to reach 164 dB, 24 repetitions of a 776 bit packet spanning over 9 ms requires a 216 ms transmission/reception time in total. Therefore, the time constraints imposed by such systems are a significant challenge.

In addition to these time constraints, NB-IoT systems operate in a narrow frequency bandwidth, utilizing only a single physical resource block (PRB) of size 180 KHz, which is divided into several subcarriers. This bandwidth reduction allows for less complex hardware in the NB-IoT UEs, thereby lowering associated manufacturing costs. For frequency division duplexing (FDD) communication (i.e., the transmitter and receiver operate at different carrier frequencies), only half-duplex mode needs to be supported by the UE. The significantly lower complexity of the UEs (e.g. only one transmission/receiver chain) demands transmission repetition for communication integrity in low SNR scenarios, and even means that repetition might be needed also in normal or robust coverage scenarios. Further, to alleviate UE complexity, the working assumption is to have cross-subframe scheduling. That is, a transmission is first scheduled on an Enhanced Physical DL Control Channel (E-PDCCH or "NB-PDCCH") and then the first transmission of the actual data on the Physical DL Shared Channel (PDSCH) is carried out after the final transmission of the NB-PDCCH. Similarly, for uplink (UL) data transmission, information about resources scheduled by the network and needed by the UE for UL transmission is conveyed on the NB-PDCCH and then the first transmission of the actual data by the UE on the Physical UL Shared Channel (PUSCH) is carried out after the final transmission of the NB-PDCCH.

Thus, for both cases above, NB-IoT does not support simultaneous reception of control channel signals and reception/transmission of data channel signals at the UE. In other words, due to the simplicity of the NB-IoT UEs, only one link and channel is supported at any time. Although this simplicity attempts to further the goal of reducing the cost of NB-IoT UEs, it threatens to wastefully consume scarce radio resources and starve some NB-IoT UEs from service.

SUMMARY

In some embodiments herein, a transmission may be transmitted or received with transmission gaps therein, e.g., according to a transmission gap pattern that specifies a pattern of transmission gaps in time. Transmission gaps may be effectively inserted in this way into or during a transmission that comprises, for example, a data block and one or more repetitions of the data block. In these and other cases, the transmission gaps may interrupt the transmission to provide opportunities (e.g., for other transmissions) that would have been prevented or at least delayed without such gaps. For instance, where repetitions of a data block might otherwise prolong the transmission to the point of blocking another transmission from occurring for an unacceptable amount of time, a transmission gap in the transmission may provide an earlier opportunity for that other transmission.

More generally, embodiments herein include a user equipment configured for use in a wireless communication system. The user equipment comprises one or more radio circuits and one or more processing circuits. The one or more processing circuits are configured to receive, from a base station, via the one or more radio circuits of the user equipment, one or more configuration messages that indicate a pattern of downlink transmission gaps in time. The one or more processing circuits are further configured to receive from the base station, via the one or more radio circuits of the user equipment, a scheduled downlink transmission that comprises a downlink data block and one or more repetitions of the downlink data block. The scheduled downlink transmission is received with downlink transmission gaps therein according to the indicated pattern.

In some embodiments, the one or more processing circuits are further configured to receive, via the one or more radio circuits of the user equipment, a scheduling message that indicates scheduling of the downlink data block and the one or more repetitions. In one such embodiment, the one or more processing circuits are configured to receive the scheduled downlink transmission after or based on the scheduling message.

In one or more embodiments, the one or more configuration messages include information that is usable to determine a duration of each downlink transmission gap.

In some embodiments, the one or more configuration messages include information indicating a periodicity of the downlink transmission gaps.

In any of these embodiments, the one or more configuration messages may comprise radio resource control (RRC) signaling.

In some embodiments, the one or more processing circuits are configured to receive the scheduled downlink transmission from the base station in a half-duplex manner.

Alternatively or additionally, the one or more processing circuits may be configured to receive the scheduled downlink transmission over an entire system bandwidth of the wireless communication system.

In any of these embodiments, a system bandwidth of the wireless communication system may be 180 kHz. and the scheduled downlink transmission may have a transmission bandwidth of 180 kHz.

In some embodiments, the downlink data block is a downlink transport block.

In some embodiments, the one or more processing circuits are configured to receive repetitions of the downlink data block with transmission gaps therebetween according to the indicated pattern.

In one or more embodiments, the one or more processing circuits are alternatively or are further configured to transmit, via the one or more radio circuits of the user equipment, a scheduled uplink transmission that comprises an uplink data block and one or more repetitions of the uplink data block. In this case, the scheduled uplink transmission may be transmitted with uplink transmission gaps therein according to an uplink transmission gap pattern that specifies a pattern of uplink transmission gaps in time.

In this case, the one or more processing circuits may be configured to receive a scheduling message that indicates scheduling of the uplink data block and the one or more repetitions of the uplink data block.

Alternatively or additionally, the uplink transmission gap pattern may specify an uplink transmission gap with a predefined transmission gap time period. In some embodiments, for example, the uplink transmission gap pattern specifies a predefined maximum continuous transmission interval for the user equipment, after which the user equipment is to insert the uplink transmission gap with the predefined transmission gap time period.

In some embodiments, the one or more processing circuits are configured to transmit the scheduled uplink transmission to the base station in a half-duplex manner.

In one or more embodiments, the one or more processing circuits are configured to transmit repetitions of the uplink data block with uplink transmission gaps therebetween according to the uplink transmission gap pattern.

Still other embodiments envision certain combinations or permutations of the above features related to the scheduled uplink transmission. For example, in some embodiments, the one or more processing circuits are configured to receive, via the one or more radio circuits of the user equipment, a scheduling message that indicates scheduling of the uplink data block and the one or more repetitions of the uplink data block. Moreover, in these embodiments, the one or more processing circuits are configured to transmit the scheduled uplink transmission in a half-duplex manner, and the uplink transmission gap pattern specifies an uplink transmission gap with a predefined transmission gap time period. The wireless communication system in this case may be a narrowband Internet of Things (NB-IoT) system. As a NB-IoT system, the scheduled uplink transmission may be a narrowband physical uplink shared channel transmission, and a transmission gap may be inserted in the narrowband physical uplink shared channel transmission.

Yet other embodiments also envision certain combinations or permutations of the above features related to the scheduled downlink transmission. For example, in some embodiments, the one or more processing circuits are configured to receive, via the one or more radio circuits of the user equipment, a scheduling message that indicates scheduling of the downlink data block and the one or more repetitions of the downlink data block. Moreover, in these embodiments, the one or more processing circuits are configured to receive the scheduled downlink transmission from the base station in a half-duplex manner, and the one or more configuration messages include information that is usable to determine a duration of each downlink transmission gap and information indicating a periodicity of the downlink transmission gaps. The wireless communication system in this case may be a narrowband Internet of Things (NB-IoT) system. As a NB-IoT system, the scheduled downlink transmission may be a narrowband physical downlink shared channel transmission, and a transmission gap may be inserted in the narrowband physical downlink shared channel transmission.

Embodiments herein also include a base station configured for use in a wireless communication system. The base station comprises one or more radio circuits and one or more processing circuits. The one or more processing circuits are configured to transmit to a user equipment, via the one or more radio circuits of the base station, one or more configuration messages that indicate a pattern of downlink transmission gaps in time. The one or more processing circuits are also configured to transmit to the user equipment, via the one or more radio circuits of the base station, a scheduled downlink transmission that comprises a downlink data block and one or more repetitions of the downlink data block. The scheduled downlink transmission is transmitted with downlink transmission gaps therein according to the indicated pattern.

In some embodiments, the one or more processing circuits are configured to transmit, via the one or more radio circuits of the base station, a scheduling message that indicates scheduling of the downlink data block and the one or more repetitions of the downlink data block. In one such embodiment, the one or more processing circuits are configured to transmit, via the one or more radio circuits, the scheduled downlink transmission after or based on the scheduling message.

In some embodiments, the one or more configuration messages include information that is usable to determine a duration of each downlink transmission gap.

In some embodiments, the one or more configuration messages include information indicating a periodicity of the downlink transmission gaps.

In any of these embodiments, the one or more configuration messages may comprise radio resource control (RRC) signaling.

In some embodiments, the one or more processing circuits are configured to transmit the scheduled downlink transmission to the user equipment in a half-duplex manner with respect to the user equipment.

Alternatively or additionally, the one or more processing circuits may be configured to transmit the scheduled downlink transmission over an entire system bandwidth of the wireless communication system.

In any of these embodiments, a system bandwidth of the wireless communication system may be 180 kHz, and the scheduled downlink transmission may have a transmission bandwidth of 180 kHz.

In some embodiments, the downlink data block is a downlink transport block.

In some embodiments, the one or more processing circuits are configured to transmit repetitions of the downlink data block with transmission gaps therebetween according to the indicated pattern.

In one or more embodiments, the one or more processing circuits are alternatively or are further configured to receive, via the one or more radio circuits of the base station, a scheduled uplink transmission that comprises an uplink data block and one or more repetitions of the uplink data block. In this case, the scheduled uplink transmission may be received with uplink transmission gaps therein according to an uplink transmission gap pattern that specifies a pattern of uplink transmission gaps in time.

In this case, the one or more processing circuits may be configured to transmit, via the one or more radio circuits of the base station, a scheduling message that indicates scheduling of the uplink data block and the one or more repetitions of the uplink data block.

Alternatively or additionally, the uplink transmission gap pattern may specify an uplink transmission gap with a predefined transmission gap time period. In some embodiments, for example, the uplink transmission gap pattern specifies a predefined maximum continuous transmission interval for the user equipment, after which the uplink transmission gap with the predefined transmission gap time period is to be inserted.

In some embodiments, the one or more processing circuits are configured to receive the scheduled uplink transmission from the user equipment in a half-duplex manner with respect to the user equipment.

In one or more embodiments, the one or more processing circuits are configured to receive repetitions of the uplink data block with uplink transmission gaps therebetween according to the uplink transmission gap pattern.

Still other embodiments envision certain combinations or permutations of the above features related to the scheduled uplink transmission. For example, in some embodiments, the one or more processing circuits are configured to transmit, via the one or more radio circuits of the base station, a scheduling message that indicates scheduling of the uplink data block and the one or more repetitions of the uplink data block. Moreover, in these embodiments, the one or more processing circuits are configured to receive the scheduled uplink transmission in a half-duplex manner with respect to the user equipment, and the uplink transmission gap pattern specifies an uplink transmission gap with a predefined transmission gap time period. The wireless communication system in this case may be a narrowband Internet of Things (NB-IoT) system. As a NB-IoT system, the scheduled uplink transmission may be a narrowband physical uplink shared channel transmission, and a transmission gap may be inserted in the narrowband physical uplink shared channel transmission.

Yet other embodiments also envision certain combinations or permutations of the above features related to the scheduled downlink transmission. For example, in some embodiments, the one or more processing circuits are configured to transmit, via the one or more radio circuits of the base station, a scheduling message that indicates scheduling of the downlink data block and the one or more repetitions of the downlink data block. Moreover, in these embodiments, the one or more processing circuits are configured to transmit the scheduled downlink transmission from the base station in a half-duplex manner with respect to the user equipment, and the one or more configuration messages include information that is usable to determine a duration of each downlink transmission gap and information indicating a periodicity of the downlink transmission gaps. The wireless communication system in this case may be a narrowband Internet of Things (NB-IoT) system. As a NB-IoT system, the scheduled downlink transmission may be a narrowband physical downlink shared channel transmission, and a transmission gap may be inserted in the narrowband physical downlink shared channel transmission.

Embodiments also include corresponding methods and computer readable storage mediums. Some embodiments for example include a method implemented by a user equipment configured for use in a wireless communication system. The method comprises receiving from a base station one or more configuration messages that indicate a pattern of downlink transmission gaps in time. The method also comprises receiving from the base station a scheduled downlink transmission that comprises a downlink data block and one or more repetitions of the downlink data block. The scheduled downlink transmission is received with downlink transmission gaps therein according to the indicated pattern.

In some embodiments, the method alternatively or further comprises transmitting a scheduled uplink transmission that comprises an uplink data block and one or more repetitions of the uplink data block, wherein the scheduled uplink transmission is transmitted with uplink transmission gaps therein according to an uplink transmission gap pattern that specifies a pattern of uplink transmission gaps in time.

Other embodiments include a method implemented by a base station configured for use in a wireless communication system. The method comprises transmitting to a user equipment one or more configuration messages that indicate a pattern of downlink transmission gaps in time. The method also comprises transmitting to the user equipment a scheduled downlink transmission that comprises a downlink data block and one or more repetitions of the downlink data block. The scheduled downlink transmission is transmitted with downlink transmission gaps therein according to the indicated pattern.

In some embodiments, the method alternatively or further comprises receiving a scheduled uplink transmission that comprises an uplink data block and one or more repetitions of the uplink data block, wherein the scheduled uplink transmission is received with uplink transmission gaps therein according to an uplink transmission gap pattern that specifies a pattern of uplink transmission gaps in time.

Accordingly, at least some embodiments herein introduce transmission gaps into a data block transmission that is made over an entire system bandwidth and/or in a half-duplex manner, e.g., as in an NB-IoT system. These transmission gaps may provide opportunities for a radio node to transmit and/or receive control signalling, e.g., in the midst of the data block transmission that would otherwise prevent such opportunities. Alternatively or additionally, the transmission gaps may provide opportunities for other radio nodes to transmit and/or receive. e.g., in the midst of the data block transmission that would otherwise block those opportunities and starve the other radio nodes.

In some embodiments, the data block transmission involves transmitting a data block as well as one or more repetitions of that data block. In this case, a radio node transmits repetitions of a data block over an entire system bandwidth and/or in a half-duplex manner, e.g., as in an NB-IoT system. Notably, though, the radio node transmits those repetitions with transmission gaps therebetween according to a transmission gap pattern. In some embodiments, this advantageously provides an opportunity for the radio node to receive control signalling from the data block's recipient informing the radio node that the data block has been successfully decoded. Based on this control signalling, the radio node halts transmission of further repetitions and thereby frees the radio resources that would have been consumed, to be used for other purposes. In other embodiments, the transmission gaps provide an opportunity for other radio nodes to transmit or receive, rather than starve while the radio node continues to transmit further repetitions.

BRIEF DESCRIPTION OF THE DRAWINGS

FIG. 2A is a logic flow diagram of a method performed by a user equipment for transmitting an uplink transmission with transmission gaps according to one or more embodiments.

FIG. 2B is a logic flow diagram of a method performed by a base station for receiving an uplink transmission with transmission gaps according to one or more embodiments.

DETAILED DESCRIPTION

Figure 1:
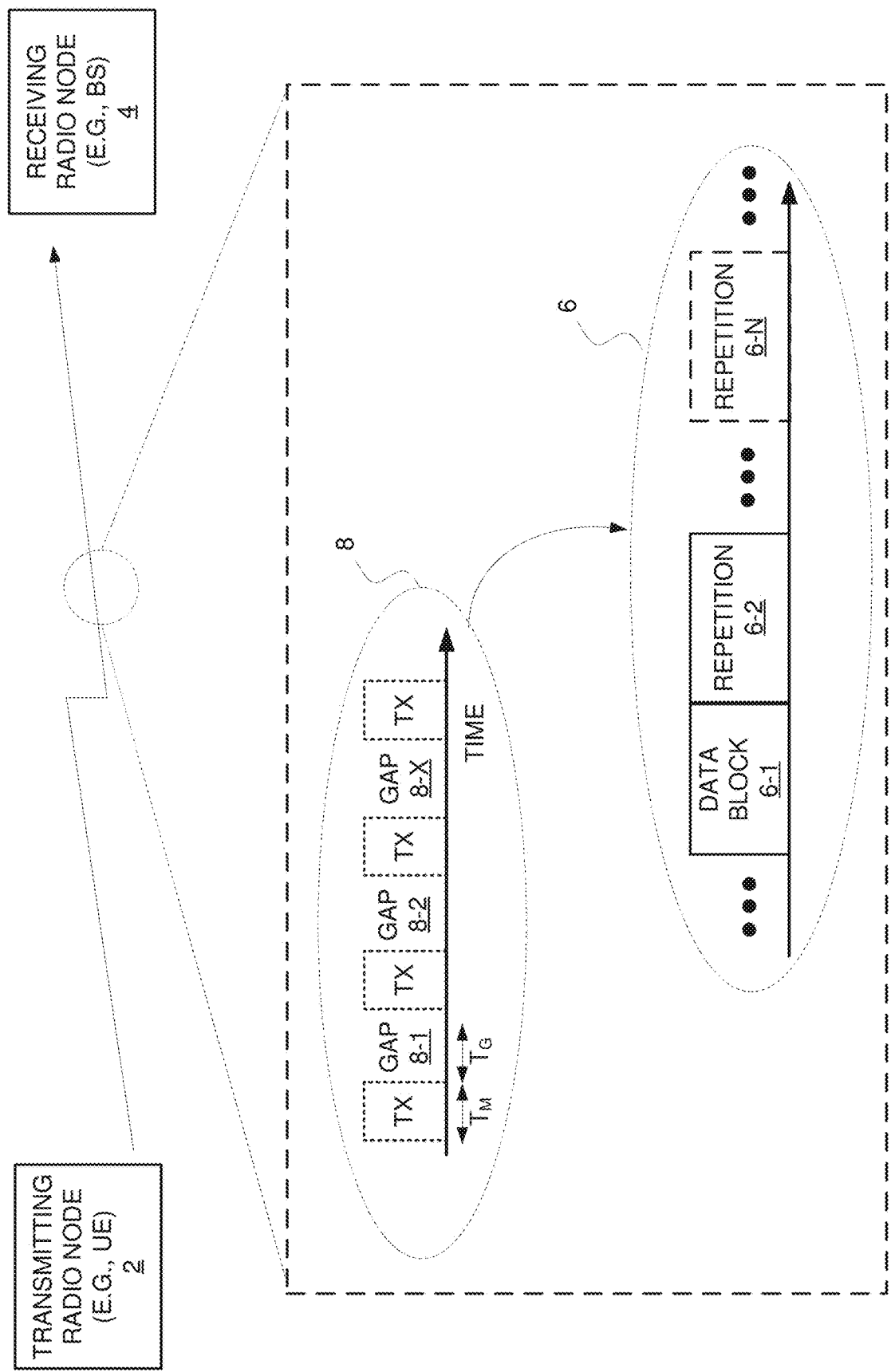
FIG. 1 is a block diagram of a wireless communication system according to one or more embodiments.

FIG. 1 illustrates a wireless communication system according to some embodiments. The system includes a transmitting radio node 2 and a receiving radio node 4. In some embodiments, the transmitting radio node 2 is a wireless communication device (e.g., a user equipment, UE) and the receiving radio node 4 is a radio network node (e.g., a base station, BS), whereas in other embodiments the converse is true such that the transmitting radio node 2 is a radio network node and the receiving radio node 4 is a wireless communication device.

The transmitting radio node 2 is configured to transmit a transmission 6 and the receiving radio node 4 is configured to receive that transmission 6. This transmission 6 may be an uplink transmission or a downlink transmission depending on the types of the transmitting and receiving radio nodes 2,4. As shown, the transmission 6 comprises at least a data block 6-1 (e.g., a transport block) and one or more repetitions 6 2, . . . 6-N of the data block 6 1. Notably, though, the transmission 6 is transmitted by the transmitting radio node 2 and received by the receiving radio node 4 with transmission gaps therein. For example, as shown in FIG. 1, the transmission 6 is transmitted with transmission gaps therein according to a transmission gap pattern 8 that specifies a pattern of transmission gaps 8-1, 8-2, . . . 8-X in time.

In some embodiments, for instance, the transmission gap pattern 8 specifies a maximum continuous transmission interval for the transmission 6, after which a transmission gap is to be inserted. FIG. 1 illustrates one example of this whereby the transmission gap pattern 8 specifies a transmission interval TM that is the maximum interval of time over which the transmitting radio node 2 is permitted to continuously transmit the transmission 6. After this maximum continuous transmission interval TM, a transmission gap (e.g., of a predetermined amount of time TG) is to be inserted. After the transmission gap, the transmission 6 is resumed. Such a transmission interval followed by a transmission gap may be repeated according to the pattern 8, e.g., as predefined or agreed to between the radio nodes 2, 4.

Accordingly, in these and other embodiments, a transmission gap may temporarily postpone the transmission 6, e.g., as compared to if the transmission gap were not inserted into the transmission 6. That is, transmission gaps may be effectively inserted into or during the transmission 6 such that the gaps interrupt the transmission 6, at least temporarily.

The interruptions attributable to the transmission gaps may, in some embodiments, advantageously be exploited as opportunities (e.g., for other transmissions) that would have been prevented or at least delayed without such gaps. For example, in some embodiments, the transmitting radio node 2 and/or the receiving radio node 4 may communicate with one or more other radio nodes during one or more of the transmission gaps. Without transmission gaps, this communication may have otherwise been blocked by the transmission 6, at least until the end of the transmission 6. In one or more embodiments, therefore, transmission gaps are introduced into a transmission 6 whose transmission time has at least a certain length, e.g., that would have otherwise blocked other transmissions for an unacceptable amount of time. This transmission time length may be specified for instance in terms of a threshold number of repetitions of the data block to be transmitted. In any event, in this and other cases, the transmitting radio node 2 and/or the receiving radio node 4 may enter a sleep or power conservation mode during transmission gaps in which they are not transmitting and/or receiving, e.g., by inactivating one or more of its receivers and/or one or more of its transmitters.

Alternatively or additionally, the receiving radio node 4 may transmit control information to the transmitting radio node 2 over a control channel during one or more of the transmission gaps. The control information may for instance acknowledge reception of the data block 6-1. In this and other cases, therefore, the control information may cause the transmitting radio node 2 to halt further transmission of any further repetitions of the data block, e.g., to conserve radio resources. In general, then, the transmission gaps may be exploited to perform other transmissions earlier than without the gaps, to provide opportunities for power conservation, and/or to conserve radio resources by avoiding unnecessary transmissions.

In some embodiments, the transmission 6 may be transmitted or received in a half-duplex manner and/or over the entire system bandwidth of the system (e.g., 180 kHz). Indeed, the half-duplex nature of the transmission 6 and/or its occupation of the entire system bandwidth may be what prevents the other transmissions and/or acknowledgements discussed above from being timely communicated absent the transmission gaps, i.e., there may not otherwise be any radio resources available for such communication. Where the receiving radio node 4 receives the transmission 6 in a half-duplex manner over the entire system bandwidth, for example, the receiving radio node 4 may otherwise not be able to acknowledge receipt of the data block 18 1 until the end of the transmission 6, when all repetitions have been received. A transmission gap in the transmission 6, though, provides such an opportunity.

The transmission gap pattern 8 (and the corresponding opportunities for exploitation) may be predefined in some embodiments, e.g., in terms of a maximum continuous transmission interval and/or a gap time period as described above. Alternatively, the transmission gap pattern 8 may be configurable, e.g., in a dynamic or semi-static manner. In some embodiments, for instance, one or more configuration messages (e.g., radio resource control, RRC, messages) transmitted between the transmitting radio node 2 and the receiving radio node 4 may include information indicating the transmission gap pattern 8. e.g., in terms of one or more characteristics of the pattern 8. The information may for example be usable to determine a duration of each transmission gap. The information may alternatively or additionally indicate a periodicity of the transmission gaps.

Moreover, in some embodiments, the transmission 6 is a scheduled transmission. The transmission of a data block and one or more repetitions of the data block may for instance be scheduled (e.g., to occur in contiguous transmission time periods), subject to transmission gaps interrupting that transmission according to the transmission gap pattern 8. In fact, in some embodiments, the scheduling of a data block and one or more repetitions of the data block is indicated by a scheduling message (e.g., a downlink control information. DCI, message) transmitted between the transmitting radio node 2 and the receiving radio node 4. The transmission gap pattern 8 in this case may be predefined, signaled in the same scheduling message, or signaled separately in one or more other configuration messages (e.g., one or more RRC messages). In some sense, the combination of the scheduling message and the transmission gap pattern may indicate scheduling of the transmission 6 with transmission gaps therein.

In view of the above variations and modifications, FIG. 2A generally illustrates a method according to some embodiments where the transmission 6 is a scheduled (uplink) transmission transmitted from a user equipment to a base station. This scheduled transmission may be for instance a narrowband physical uplink shared channel transmission, e.g., in a narrowband internet of things (NB-IoT) system. Regardless, the method in FIG. 2A is implemented by the user equipment configured for use in a wireless communication system. As shown, the method comprises transmitting to a base station a scheduled transmission 6 that comprises a data block and one or more repetitions of the data block (Step 102). Notably, the scheduled transmission 6 is transmitted with transmission gaps therein according to a transmission gap pattern 8 that specifies a pattern of transmission gaps in time. In some embodiments, the method may further include determining this transmission gap pattern 8 (Step 104), e.g., as predefined with a maximum continuous transmission interval and a transmission gap time period.

As noted above, the user equipment may in some embodiments transmit the scheduled transmission 6 in a half-duplex manner and/or over an entire system bandwidth of the system.

FIG. 2B illustrates a corresponding method implemented by the base station. As shown, the method comprises receiving from the user equipment a scheduled (uplink) transmission 6 that comprises a data block and one or more repetitions of the data block (Step 106). The scheduled transmission 6 is received with transmission gaps therein according to a transmission gap pattern 8 that specifies a pattern of transmission gaps in time. In some embodiments, the method may further include determining this transmission gap pattern 8 (Step 108), e.g., as predefined with a maximum continuous transmission interval and a transmission gap time period.

The base station may in some embodiments receive the scheduled transmission 6 in a half-duplex manner with respect to the user equipment. That is, the base station may receive the scheduled transmission 6 from the user equipment without simultaneously transmitting to that user equipment. This may be the case even if the base station simultaneously transmits to a different user equipment, i.e., the base station may participate in half-duplex communications with the user equipment. Alternatively or additionally, the base station may receive the scheduled transmission 6 over an entire system bandwidth of the system.

Figures 3A, 3B:
FIG. 3A is a logic flow diagram of a method performed by a base station for transmitting a downlink transmission with transmission gaps according to one or more embodiments.
FIG. 3B is a logic flow diagram of a method performed by a user equipment for receiving a downlink transmission with transmission gaps according to one or more embodiments.

Also in view of the above variations and modifications, FIG. 3A generally illustrates a method according to some embodiments where the transmission 6 is a scheduled (downlink) transmission transmitted from a base station to a user equipment. This scheduled transmission may be for instance a narrowband physical downlink shared channel transmission. e.g., in a narrowband internet of things (NB-IoT) system. Regardless, the method in FIG. 3A is implemented by the base station configured for use in a wireless communication system. As shown, the method comprises transmitting to a user equipment one or more configuration messages that indicate a pattern of transmission gaps in time (Block 202). The one or more configuration messages (e.g., RRC messages) may for instance indicate a duration of each transmission gap and/or a periodicity if the transmission gaps. In any event, the method also comprises transmitting to the user equipment a scheduled transmission 6 that comprises a data block and one or more repetitions of the data block (Block 204). The scheduled transmission 6 is notably transmitted with transmission gaps therein according to the indicated pattern.

Similarly to the uplink case, the base station may in some embodiments transmit the scheduled transmission 6 in a half-duplex manner with respect to the user equipment. That is, the base station may transmit the scheduled transmission 6 to the user equipment without simultaneously receiving from that user equipment. This may be the case even if the base station simultaneously receives from a different user equipment, i.e., the base station may participate in half-duplex communications with the user equipment. Alternatively or additionally, the base station may transmit the scheduled transmission 6 over an entire system bandwidth of the system.

FIG. 3B illustrates a corresponding method implemented by the user equipment. As shown, the method comprises receiving from a base station one or more configuration messages that indicate a pattern of transmission gaps in time (Block 306). The one or more configuration messages (e.g., RRC messages) may for instance indicate a duration of each transmission gap and/or a periodicity if the transmission gaps. In any event, the method also comprises receiving from the base station a scheduled transmission 6 that comprises a data block and one or more repetitions of the data block (Block 204). The scheduled transmission 6 is notably received with transmission gaps therein according to the indicated pattern.

As noted above, the user equipment may in some embodiments receive the scheduled transmission 6 in a half-duplex manner and/or over an entire system bandwidth of the system.

Embodiments herein further include combinations of the methods in FIGS. 2A-2B and 3A-3B. A user equipment may for instance be configured to implement the methods in FIGS. 2A and 3B. Similarly, a base station may be configured to implement the methods in FIGS. 2B and 3A.

Figure 4:
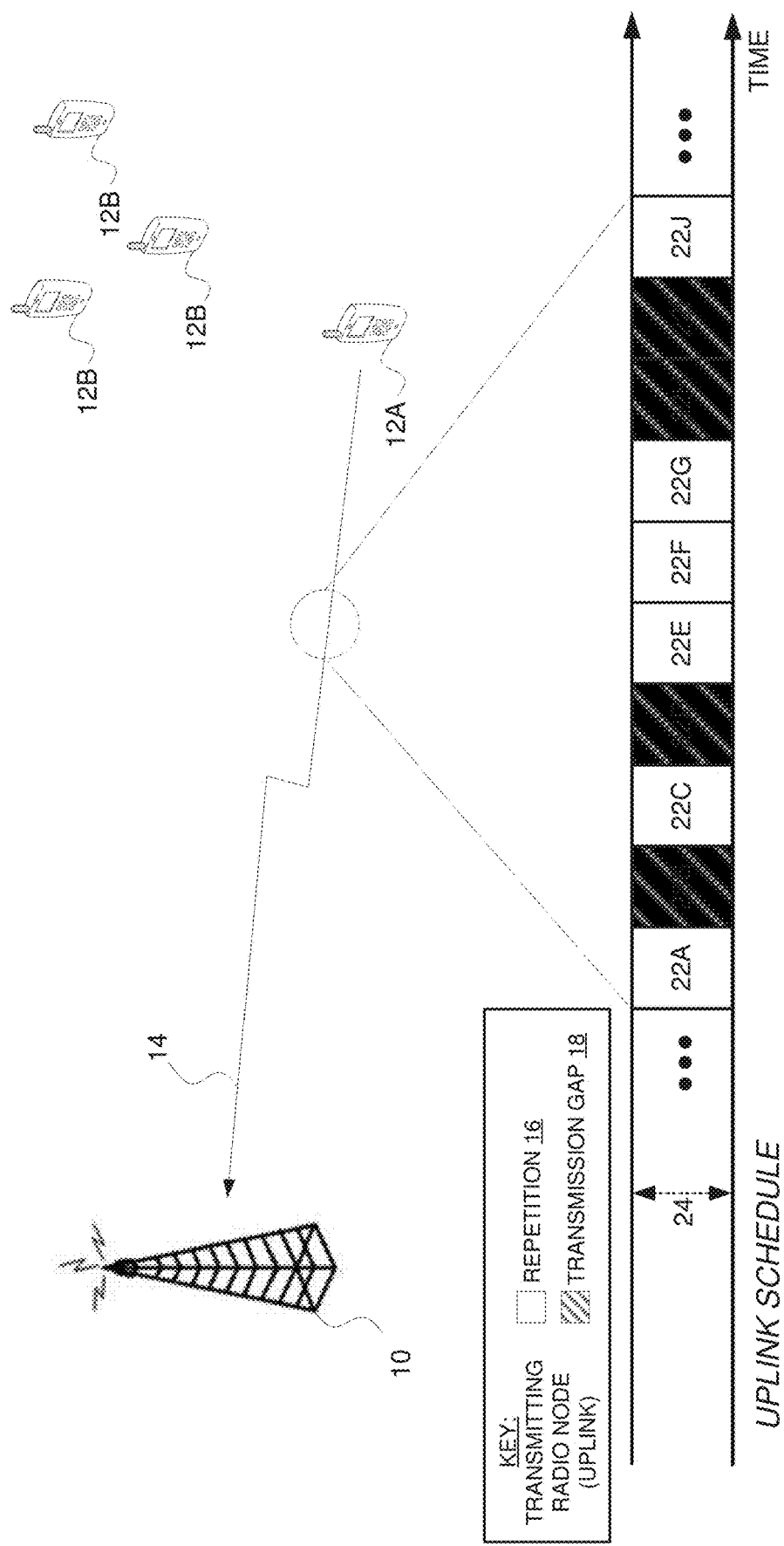
FIG. 4 is a block diagram of a wireless communication system according to one or more other embodiments.

FIG. 4 illustrates yet other embodiments herein. As shown, a radio network node 10 and wireless communication devices 12 (including 12A and 12B) are included in a wireless communication system. In an example implementation shown in FIG. 4, the wireless communication device 12A is configured to perform an uplink transmission 14 that includes repetitions (i.e., two or more transmissions) of a data block (e.g., transport block or any other subset of a data packet) over an uplink channel (e.g., a Physical UL Shared Channel (PUSCH)). The wireless communication system of FIG. 4 is not limited, however, to uplink transmissions by the wireless communication devices 12. Instead, for instance, in a further embodiment not specifically shown in FIG. 4, the radio network node 10 may be configured to transmit repetitions of a data block to the wireless communication device 12 on a downlink channel (e.g., Physical Downlink Shared Channel (PDSCH)). Alternatively, the radio network node 10 may transmit control signals (or repetitions thereof) to one or more of the wireless communication devices 12 on a control channel (e.g., an Enhanced Physical DL Control Channel (E-PDCCH, or Narrow Band E-PDCCH (NB-PDCCH)).

Therefore, given that the wireless communication presented in the present disclosure may be implemented for transmissions and corresponding receptions in either the uplink or downlink, the more general terminology suggested above will be utilized throughout the present disclosure. Specifically, depending on the particular implementation, the radio network node 10 and wireless communication devices 12 (including 12A and 12B) may be referred to as a receiving radio node or a transmitting radio node. For instance, for the uplink data block repetition transmission scenario illustrated in FIG. 4, wireless communication device 12 may also be characterized as the transmitting radio node and the radio network node 10 receiving the uplink repetition transmissions may be characterized as the receiving radio node. The opposite characterizations are assigned for downlink transmissions according to the techniques presented herein. In other words, where the radio network node 10 transmits data block repetitions or control signals in the downlink, the radio network node 10 would be characterized as the transmitting network node and the wireless communication device 12A and/or 12B would be characterized as the receiving network node.

As illustrated in FIG. 4, the uplink transmission 14 is scheduled according to uniform time periods 22, which include 10 individual time periods 22A-22J. In an aspect, each of these time periods 22 may constitute a subframe of a transmission frame where an LTE transmission scheduling paradigm is utilized in the wireless communication system, though this is not an exclusive scheduling implementation. As further shown, the time periods 22 include repetitions 16 of a data block transmission (time periods 22A, 22C, 22E, 22F, 22G, and 22J) as well as transmission gaps 18 (time periods 22B, 22D, 22H, and 22I). This pattern of repetitions 16 may be interlaced with transmission gaps 18 according to a transmission gap pattern of the present disclosure. By inserting the transmission gaps 18 into the uplink transmission 14, other devices (e.g., the receiving device (radio network node 10) and other wireless communication devices 12B) are able to access the system frequency bandwidth 24 to carry out uplink or downlink transmission of data blocks or control signaling. This operation prevents the uplink transmission 14 from blocking such communications for extended periods of time, thereby improving overall communication performance for all devices in the wireless communication system.

In an aspect of the present disclosure, radio network node 10 may manage generation of the transmission gap pattern to be utilized for ongoing communication by the devices in the wireless communication system of FIG. 4. For instance, based on current or historic network conditions or performance, the wireless network node 10 may generate the transmission gap pattern of time periods 22 and may transmit information indicating the transmission gap pattern to the wireless communication devices 12 of the system at a time prior to implementation of the transmission gap pattern starting at time period 22A.

In some examples, information indicating the transmission gap pattern may include the time or time period 22 at which the transmission gap pattern will commence. In some alternative examples, the radio network node 10 may transmit an activation signal to the wireless network devices 12 to activate communication according to the transmission gap pattern. Therefore, in the example implementation of FIG. 4, the receiving radio node (which corresponds to radio network node 10 because radio network node 10 receives the repetition transmissions 16 for time periods 22) may be configured to determine a transmission gap pattern that specifies a pattern of transmission gaps 18 in time. Once determined, the receiving radio node of FIG. 4 may be further configured to receive repetitions of the data block from the transmitting radio node (which corresponds to wireless communications device 12 in FIG. 4 because wireless communication device 12 transmits the repetitions 16 of the data block). According to an aspect of the disclosure, these repetitions 16 may be transmitted as unicast transmissions, though in some alternative embodiments the repetitions 16 may be broadcast or multicast transmissions.

Furthermore, as illustrated in FIG. 4, the uplink transmission 14 may be transmitted over an entire system bandwidth 24. In a further aspect of the present disclosure, alternatively or additionally, the uplink transmission 14 may be transmitted in a half-duplex manner. For purposes of the present disclosure, the term "half-duplex manner" or "half-duplex transmission" or the like refers to a communication that is transmitted or received by a wireless communication device 12 that is configured to exclusively transmit or exclusively receive wireless communication signals at a given point in time (or during a given time period 22 of the transmission gap pattern).

Figure 5:
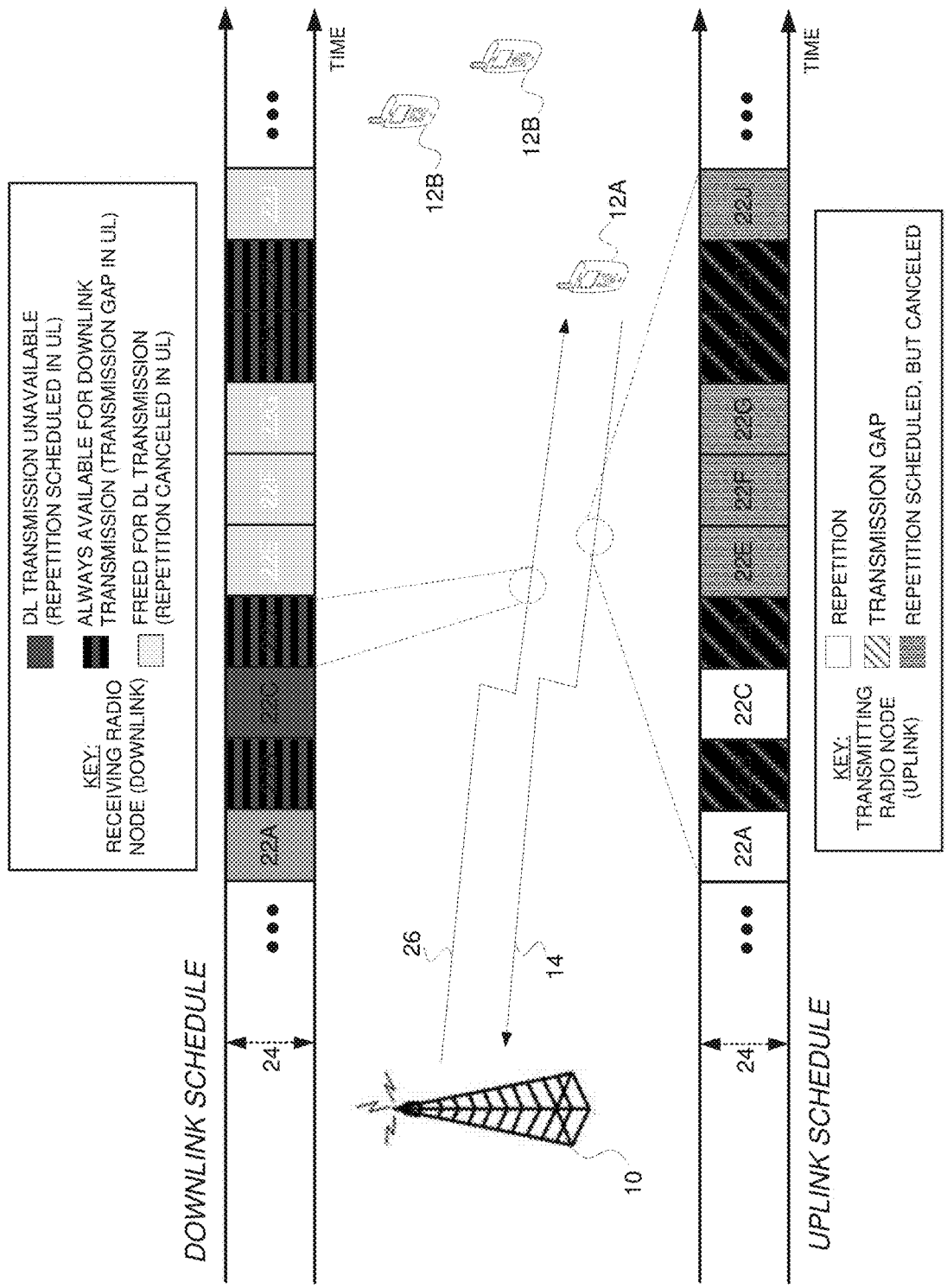
FIG. 5 is a block diagram of a wireless communication system according to yet other embodiments.

FIG. 5 illustrates a further example implementation of the present disclosure, namely, the transmission of a stop transmission signal 26 over a downlink control channel (e.g., NB-PDCCH) during a transmission gap at time block 22D of the transmission gap pattern. Again shown in FIG. 5 is the transmission gap pattern and uplink schedule associated with uplink transmission 14 by the transmitting radio node over all time blocks 22. In addition to the schedule of uplink transmission 14. FIG. 5 also illustrates a downlink schedule for transmissions to the transmitting radio node (wireless communication device 12A) from the receiving radio node (radio network node 10). As shown in the corresponding key, at time blocks 22A and 22C, downlink transmissions are unavailable because uplink repetitions of the data block are scheduled for transmission over the entire system bandwidth 24 by the transmitting device. At time blocks 22B and 22D, as well as 22H and 22I, there exists a possibility that downlink transmissions may be scheduled for transmission to wireless communication device 12A because transmission gaps are scheduled during these periods.

Also, as shown in FIG. 5, during the transmission gap at time block 22D, the receiving radio node, radio network node 10, may transmit the stop transmission signal 26 to the transmitting radio node, wireless communication device 12A. For purposes of the present disclosure, this utilization of transmission gap at time block 22D for transmission of control information from the receiving radio node (radio network node 10) to the transmitting radio node (wireless communication device 12A) may be referred to as having an "active gap" for its transmission gap type. This is because, from the perspective of the wireless communication device 12A (the transmitting radio node for time blocks 22), any communication over the system frequency bandwidth 24 during time block 22D involves itself, wireless communication device 12A. As a result of this involvement, wireless communication device 12A is required to remain in an "active" state rather than a sleep or low-power state, because it may receive control information from radio network node 10 during the transmission gap.

In an aspect, the radio network node 10 may have determined before the beginning of that the data blocks transmitted by the transmitting device (wireless communication device 12A) during time blocks 22A and 22C were received and decoded successfully, such as by passing a cyclic redundancy check (CRC) or other transmission integrity verification mechanism known in the art. As such, rather than allow the transmitting device to continue to use the entire system frequency bandwidth 24 for the remainder of the time blocks 22 or more, the receiving device may transmit a stop transmission signal in the control information 26. This stop transmission signal may explicitly or implicitly instruct or command the transmitting device to halt any further repetitions 16 of the data block scheduled for uplink transmission, thereby freeing up any time blocks 22E, 22F, 22G, and 22J (see the receiving radio node downlink key) that were previously scheduled for repetition transmissions for use by other devices in the system. In some embodiments, the stop transmission signal comprises an acknowledgement signal that acknowledges successful decoding of the data block. The acknowledgement signal thereby implicitly informs the transmitting device to stop transmitting further repetitions of the data block, since those repetitions are no longer needed to decode the data block.

This aspect is illustrated in the uplink schedule of FIG. 5 in time blocks 22E. 22F 22G, and 22J, which, as indicated by the "repetition scheduled, but canceled" shading, were originally scheduled by radio network node 10 for repetition transmission 16 (see FIG. 4) but, when the stop transmission signal is transmitted to/received by the transmitting device wireless communication device 12A, are no longer scheduled for repetition transmissions 16. As a result, these time blocks 22E, 22F, 22G, and 22J may be scheduled as further UL or DL transmission and corresponding reception periods for radio network node 10 or wireless communication devices 12, thereby allowing increased access to the system frequency bandwidth 24 to devices other than wireless communication device 12A for the remaining time blocks 22 of FIG. 5.

Figure 6:
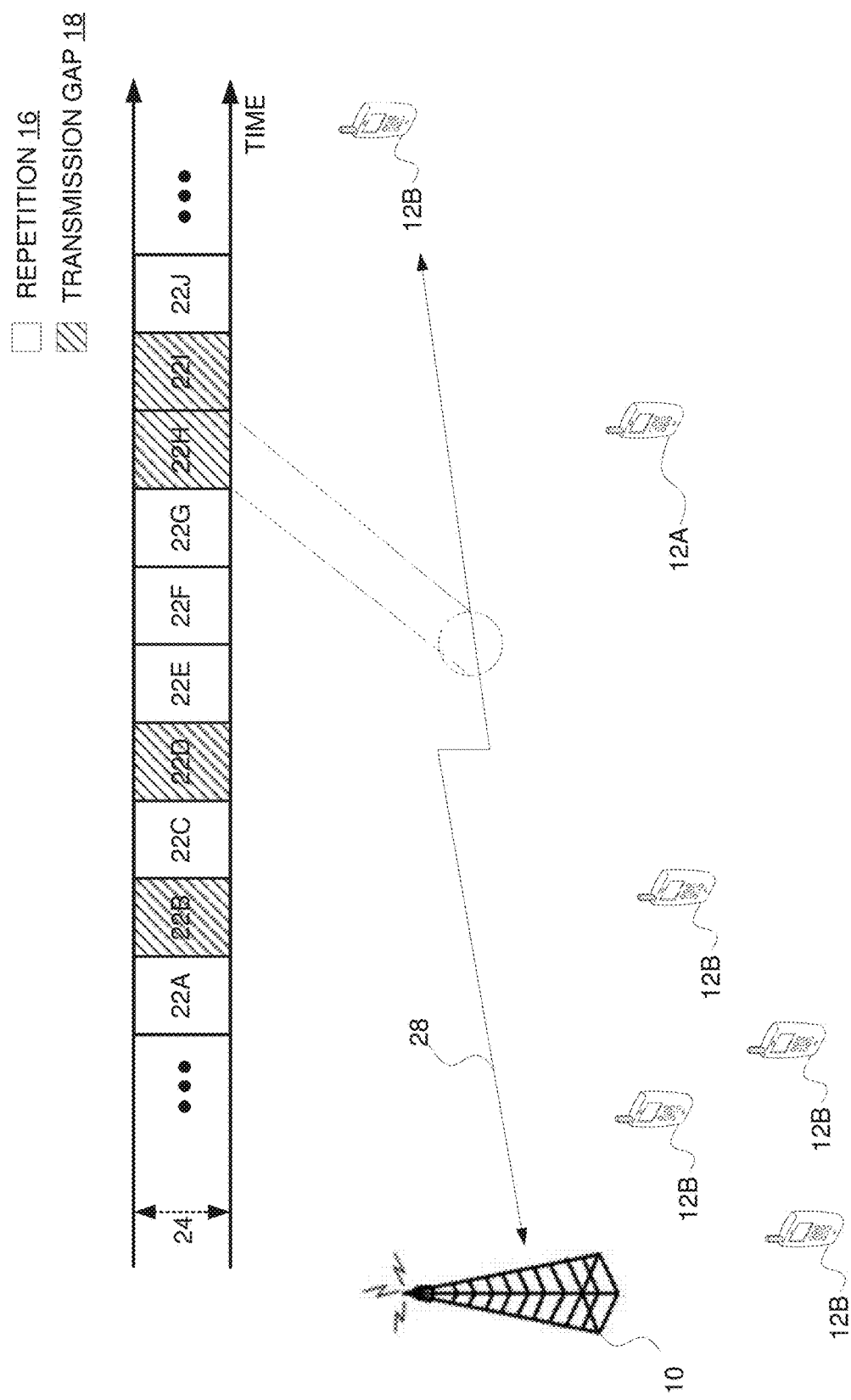
FIG. 6 is a block diagram of a wireless communication system according to still other embodiments.

Turning to FIG. 6, a further snapshot of the system during implementation of a transmission gap pattern is illustrated. In particular, FIG. 6 presents an embodiment wherein the receiving radio node communicates with one or more radio nodes other than the transmitting radio node during one or more of the transmission gaps defined in the transmission gap pattern being implemented by the system during time blocks 22. Specifically, as shown in FIG. 6, during transmission gap time block 22H, the radio network node 10 (here, the receiving radio node during the time blocks 22) communicates with wireless communication device 12B (which is a radio node other than the transmitting radio node, wireless communication device 12A in the present embodiment) during at least transmission gap 22H. For purposes of the present disclosure, this utilization of transmission gap 22H for transmission of data and/or control information between the radio network node 10 and one or more wireless communication devices 12B other than the transmitting radio node (wireless communication device 12A) may be referred to as a "dormant gap." "dormant transmission gap," or a "passive transmission gap," or "passive gap." This is because, from the perspective of the wireless communication device 12A (the transmitting radio node for time blocks 22), any communication over the system frequency bandwidth 24 involves other devices, and as a result, the wireless communication device 12A may transition to a sleep state until it is scheduled to either receive control information or data transmission from the network (e.g., potentially during time block 22I, another transmission gap) or to transmit another repetition of the data block. Furthermore, as illustrated by the active type and passive type of transmission gaps included in the same transmission gap pattern spanning time blocks 22, multiple transmission gap types can be combined in a particular transmission gap pattern.

In addition, communication 28 may include a downlink control signal or data block transmission by radio network node 10 and/or may include an uplink data block transmission by wireless communication device 12B in some example implementations. In fact, the present disclosure envisions no specific or mandated transmission or communication type during these transmission gaps 18 introduced by the transmission gap pattern. Thus, the contents (i.e., control information or data, etc.) of such transmissions may be dynamically scheduled, and the entire system bandwidth 24 (or a portion thereof in some embodiments, as described further in reference to FIG. 10, below) may be dynamically granted by radio network node 10 or another network device, to particular devices based on current network conditions, transmission urgency, or any other factor that may characterize transmissions awaiting scheduling.

Moreover, though not specifically shown in FIGS. 4-6, a transmission gap pattern may be altered or cancelled by the radio network node 10 by generating and transmitting a deactivation signal to the wireless communication devices 12 of the system. The radio network node 10 may determine to deactivate the transmission gap pattern, for example, based on detecting one or more triggering conditions. A non-limiting group of such triggering conditions may include determining that a time since the transmission gap pattern was activated has elapsed, determining that a threshold number of subframes since the transmission gap pattern was activated has been reached, determining that transmission of the repetitions has concluded, or determining that a coverage class level associated with the transmitting radio node has changed. Upon receipt of the deactivation signal, the wireless communication devices 12 may revert to legacy. i.e. non-transmission-gap-pattern transmission until a next transmission gap pattern is transmitted and activated by the wireless network node 10, for example. In an additional or alternative aspect, a transmitting radio node may deactivate the gap patterns autonomously, e.g., upon detecting the same sort of triggering conditions.

Figure 7:
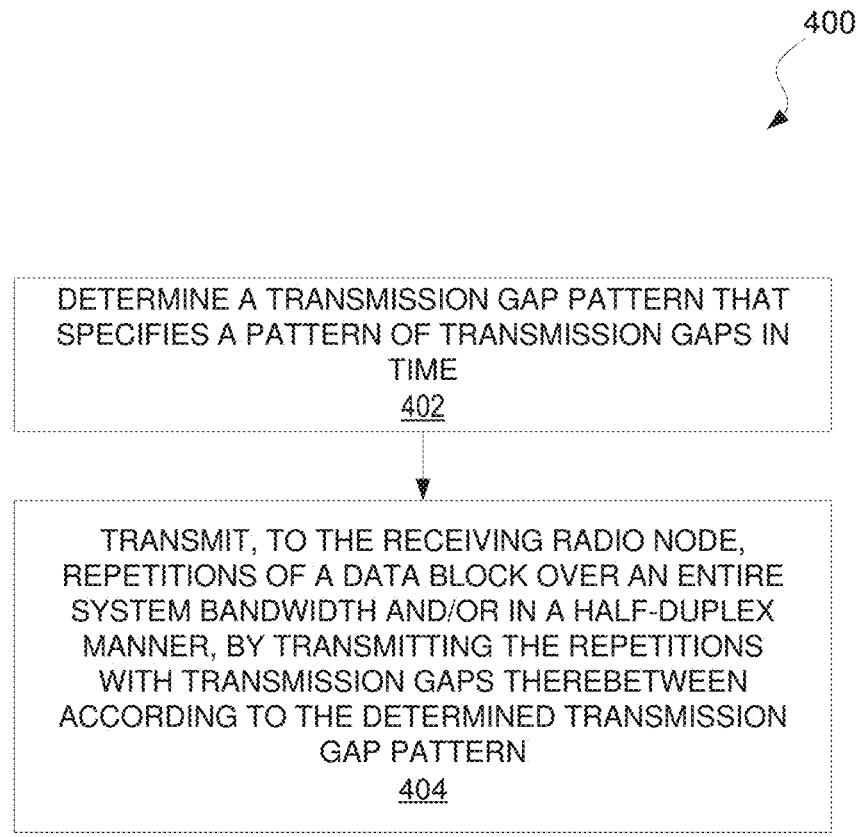
FIG. 7 is a logic flow diagram of a method implemented by a transmitting radio node according to one or more embodiments.

FIG. 7 presents a diagram containing aspect of an example method 400 for transmitting a data block to a receiving radio node in a wireless communication system, which may be implemented by a transmitting radio node in example embodiments of the present disclosure. As introduced above, depending on the uplink or downlink nature of a transmitted data block repetition, this transmitting radio node may correspond to a wireless communication device (e.g., a UE) or a radio network node 10 (e.g., an eNB). As shown in FIG. 7, method 400 may include, at block 402, determining a transmission gap pattern that specifies a pattern of transmission gaps in time. In an additional aspect, method 400 may include, at block 404, transmitting, to a receiving radio node, repetitions of a data block over an entire system bandwidth and/or in a half-duplex manner, by transmitting the repetitions with transmission gaps therebetween according to the determined transmission gap pattern. Furthermore, although not shown in FIG. 7, method 400 may include further aspects, including but not limited to those disclosed in one or more of the enumerated embodiments below.

Figure 8:
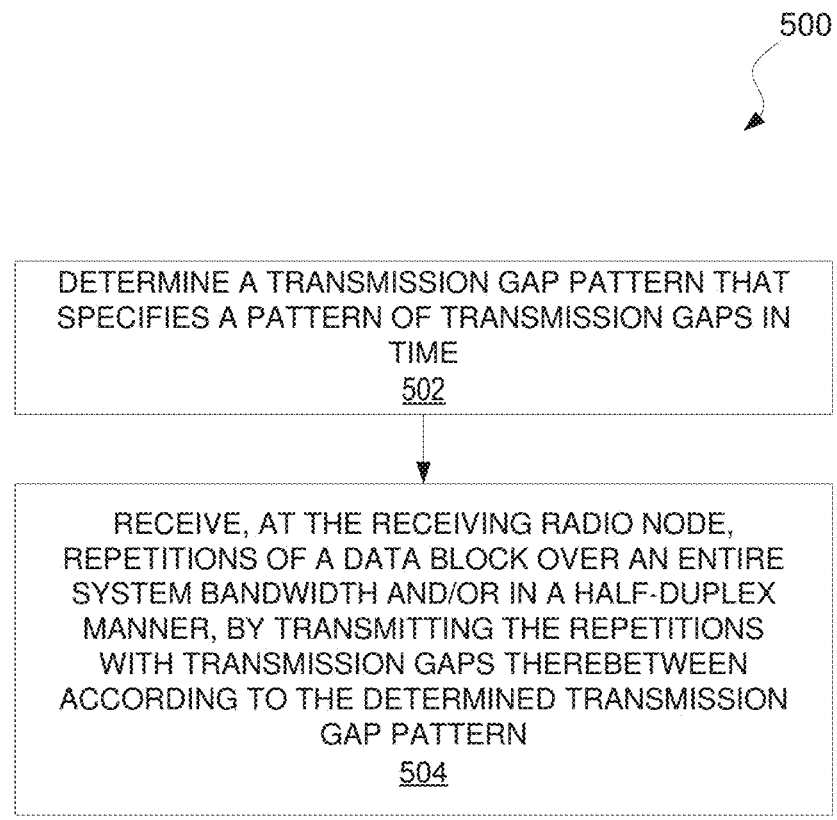
FIG. 8 is a logic flow diagram of a method implemented by a receiving radio node according to one or more embodiments.

FIG. 8 presents a diagram containing aspect of an example method 500 for receiving a data block transmitted by a transmitting radio node in a wireless communication system, which may be implemented by a receiving radio node in example embodiments of the present disclosure. As introduced above, depending on the uplink or downlink nature of a transmitted data block repetition, this receiving radio node may correspond to a wireless communication device (e.g., a UE) or a radio network node 10 (e.g., an eNB). As shown in FIG. 8, method 500 may include, at block 502, determining a transmission gap pattern that specifies a pattern of transmission gaps in time. In an additional aspect, method 500 may include, at block 504, receiving, at the receiving radio node, repetitions of a data block transmitted by the transmitting radio node over an entire system bandwidth and/or in a half-duplex manner, by receiving the repetitions with transmission gaps therebetween according to the determined transmission gap pattern. Furthermore, although not shown in FIG. 8, method 500 may include further aspects, including but not limited to those disclosed in one or more of the enumerated embodiments below.

Figure 9:
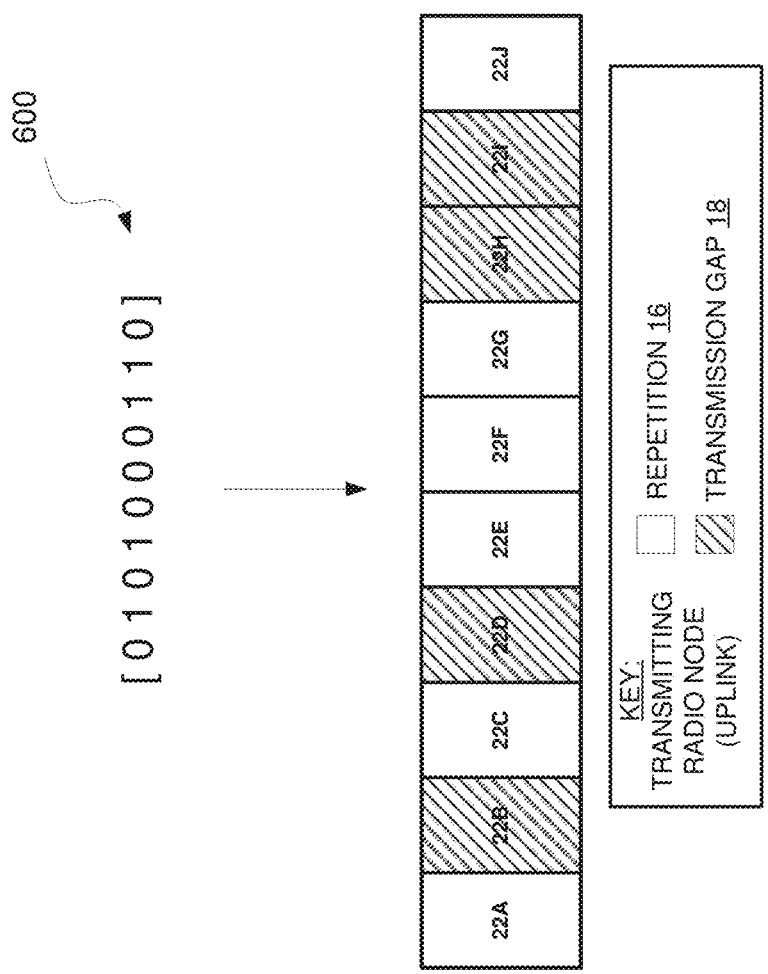
FIG. 9 is a diagram illustrating a set of bits defining a transmission gap pattern according to one or more embodiments.

FIG. 9 is a diagram illustrating a set of bits defining a transmission gap pattern according to one or more embodiments of the present disclosure. In some embodiments, radio network node 10 may be configured to generate scheduling information including time and resource/frequency/subcarrier allocations for UL and DL signal transmissions to be performed by devices. Generating this scheduling information includes generating a transmission gap pattern to be utilized by these system devices. Once the scheduling information is generated (including the transmission gap pattern), the radio network node 10 may transmit the scheduling information, including the transmission gap pattern, to the wireless communication device. In some examples, this transmission may be a DCI or a dedicated RRC signal.

In an example embodiment shown in FIG. 9, the scheduling information defining the transmission gap pattern may take the form of a set of bits 600, where each bit of the set of bits 600 corresponds to a set of time blocks 22. As shown in FIG. 9, each bit of the set of bits 600 has a value (zero or one) indicating whether a transmission gap is scheduled for the corresponding set of time blocks 22. In an aspect, a number of bits n in the set of bits 600 may be equal to the number of time blocks m in a particular transmission period, such that a ratio r of m to n equals one. This is the case in the embodiment illustrated in FIG. 9, where the set of bits contains 10 bits (n=m=10 and m:n=1) that correspond one-to-one to the ten time blocks 22 (namely, time blocks 22A-22J). As shown in FIG. 9, the radio network node 10 may set the value of a bit to zero to indicate that a repetition transmission of a data block is to be transmitted during the time block 22 corresponding to the bit and may set the value of the bit to one to indicate that that a transmission gap is scheduled for the corresponding time block 22.

In alternative embodiments, however, the number of time blocks 22 corresponding to each bit of the set of bits 600, and therefore the ratio r, may have a whole number value that is greater than one. In other words, in some examples, the radio network node 10 may configure each bit of the set of bits to correspond to more than one time block 22, thereby reducing the amount of overhead signalling required to communicate the transmission gap pattern to the wireless communication devices. For instance, in some examples, the radio network node 10 may set the ratio r to 2 to halve the required overhead signalling, may set r to 4 to reduce the signalling to one-fourth of a one-to-one r value of 1. As increasing the value of the ratio r reduces the granularity at which the time blocks 22 can be scheduled, the radio network node 10 may be configured to determine an optimal value r for transmission gap pattern scheduling under certain network conditions.

Furthermore, the transmission gap pattern can be agreed upon between the transmitting radio node and receiving radio node to be repetitive, such that a same pattern is continuously repeated, for instance, until the pattern is deactivated. In an additional aspect, rather than defining the transmission gap pattern in terms of predefined time blocks 22 (e.g. subframes, slots, or any other time period associated with a particular radio access technology or system specification (e.g., LTE)), the radio network node 10 may be configured to define the transmission gap pattern based on predefined parameter values that are accessible by each of the system devices (e.g., in a uniform MCS table), such as a transmission gap time period TG and a maximum continuous transmission interval TM.

In a further embodiment, the transmission gap pattern may be signalled with additional information regarding the features of particular scheduled transmission gaps in the pattern. For instance, the scheduling information may further include information regarding whether one or more of the scheduled transmission gaps are to constitute dormant gaps or active gaps. This and any other transmission gap pattern characteristics (e.g., such as subcarrier-specific allocation as described below in reference to FIG. 10) can additionally or alternatively be signalled through one or more explicit configuration messages transmitted via RRC signalling, a DCI message, or via a broadcast message (e.g., a system information message such as system information block (SIB) signalling).

Figure 10:
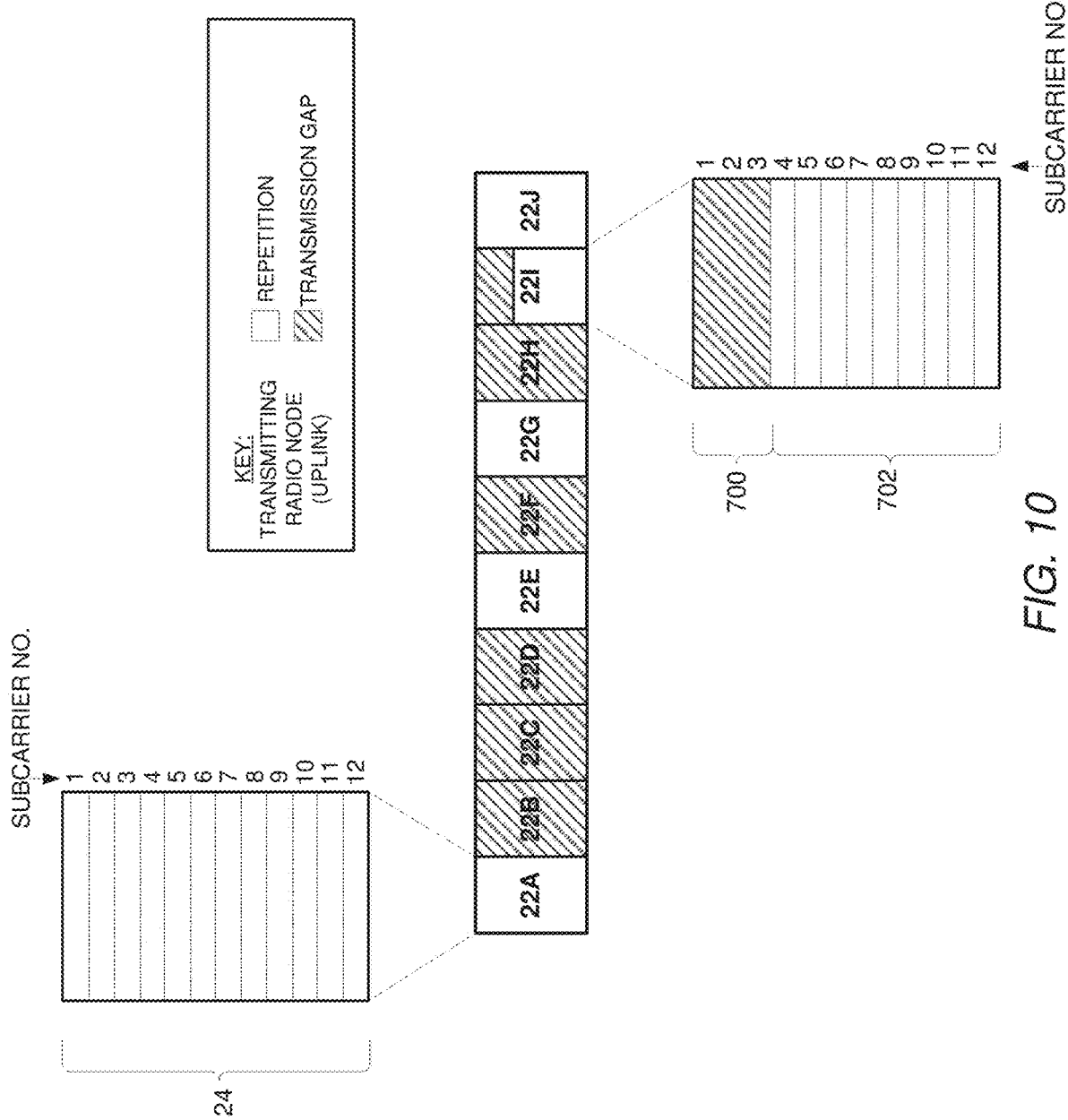
FIG. 10 is a diagram illustrating example frequency bandwidth allocations for transmission periods according to one or more embodiments.

FIG. 10 illustrates a group of time blocks 22 according to an example embodiment of the disclosure that utilizes subcarrier-level resource assignment to allow multiple simultaneous signal transmissions, e.g., in an NB IoT system. For instance, as shown in time block 22, the entire system bandwidth 24 may be divided into 12 subcarriers (or more or less subcarriers, in some examples) that may be grouped into repetition transmission subcarriers 700 (subcarrier numbers 1, 2, and 3 in time block 22) and transmission gap subcarriers 702 (subcarrier numbers 4-12). As such, rather than scheduling the entire available frequency bandwidth 24 of the system for a single transmission from a radio network node 10 or wireless communication device 12 (such as in time block 22A of FIG. 10), the frequency bandwidth 24 may be divided to facilitate concurrent transmission of multiple signals.

As described above, however, the wireless communication devices 12 of the present disclosure may be limited to half-duplex communication. Therefore, in an aspect, where a particular device 12 is transmitting (or receiving) a data block repetition over a subset of system frequency subcarriers, that same device 12 may not be able to simultaneously serve as the receiving radio node (or transmitting radio node) for the further transmission over the remaining subcarriers. In addition, though the system bandwidth 24 of FIG. 10 is divided into two groups 700 and 702, as shown, this aspect is not limiting, as resource scheduling techniques may also be implemented to divide the frequency bandwidth 24 into a greater number of subcarrier groups.

In at least some embodiments, the wireless communication system operates according to narrowband Internet of Things (NB-IoT) specifications. In this regard, embodiments described herein are explained in the context of operating in or in association with a radio access network (RAN) that communicates over radio communication channels with wireless communication devices, also interchangeably referred to as wireless terminals or UEs, using a particular radio access technology. More specifically, some embodiments are described in the context of the development of specifications for NB-IoT, particularly as it relates to the development of specifications for NB-IoT operation in spectrum and/or using equipment currently used by E UTRAN, sometimes referred to as the Evolved UMTS Terrestrial Radio Access Network and widely known as the LTE system.

The required repetition of control and user data transmissions, along with having only one available PRB for communication in a NB-IoT system can cause significant latency issues where a UE is in poor coverage that requires a relatively high number of transmission repetitions, thereby blocking the limited available system frequency bandwidth over an extended period of time. As a result, other NB-IoTs UEs that share the system frequency bandwidth that may need the medium for communication would otherwise be forced to wait until the UE has completed its signal transmission or reception. Compounding these issues, there is heretofore no technique available for an eNB to convey control messages to the UE while data reception or transmission is ongoing between the eNB and the UE. For example, in case a UE in poor coverage is in the process of transmitting repetitive data, there is heretofore no controlled way for the eNB to stop the transmission in case the eNB already has received the UL data successfully, rendering the only available system frequency bandwidth resources unnecessarily blocked by the UE.

Thus, given the above-outlined time and frequency bandwidth constraints, along with the demand of providing MTC services to a high number of low-power devices, there exists a need for techniques for providing control signaling to UEs transmitting or receiving under poor network coverage conditions such that other UEs may utilize the limited frequency bandwidth of the system in a timely manner.

Therefore, techniques presented in the present disclosure utilize radio network nodes (e.g., eNBs) and/or wireless communication devices (e.g., UEs) that may be configured to communicate according to a transmission gap pattern wherein transmission gaps are inserted between repeated transmissions of data blocks over an uplink or downlink channel (e.g., the PUSCH or PDSCH). Furthermore, as aspects of the present disclosure may be implemented in an NB-IoT system, given the narrow-band nature of such systems and the relatively limited communication capabilities of the IoT devices serviced by the system, these repeated data block transmissions may be transmitted using an entire bandwidth of the NB-IoT system and/or may be transmitted in a half-duplex manner. By implementing these aspects, some embodiments herein can prevent the limited available frequency bandwidth of the NB-IoT system from being blocked to other devices during a long communication period with a particular UE that happens to be located in an area having poor system network coverage.

According to example embodiments described herein, a radio network node, such as an eNB or other wireless access point, may initially transmit downlink control information (DCI) containing a downlink assignment message to one or more wireless communication devices of the system, for instance, over a downlink control channel (NB-PDCCH). This DCI may contain information about the time and frequency resource allocations for the system devices, the modulation and coding scheme (MCS) to be utilized, and a number of repetitions of a data block that are to be transmitted over the NB-PDSCH. For UL data block repetition transmissions, the wireless communication device can identify uplink shared channel (NB-PUSCH) resources (e.g., time and frequency). MCS, and repetition rate to use for the uplink based on information provided by the eNB on the NB-PDCCH in the DCI when an uplink grant is received.

Furthermore, according to example techniques described in the present disclosure, the radio network node may generate a pattern of repetition transmissions mixed in time with transmission gaps between the repetitions. As a result, once the transmission gap pattern is generated, the radio network node may transmit information indicating it to the wireless communication devices (e.g., the NB IoT UEs in an NB IoT system implementation described herein) in the same DCI containing the above control information or a separate DCI transmission.

In some embodiments, the radio network node may subsequently transmit an activation signal to the wireless communication devices via a further DCI message or other control information transmission, for instance, over the NB-PDCCH. Upon receiving the transmission gap pattern, the characteristic system control information, and potentially an activation signal contained in the one or more DCIs, the wireless communication device or the radio network node may begin transmitting data block repetitions that may be intermittently interrupted by the transmission gaps defined in the transmission gap pattern being utilized. Depending on which device is transmitting the repetitions, one of the wireless communication device or the radio network node may be characterized as the transmitting network node and the other the receiving network node until the transmission gap pattern is deactivated.

During the repetition transmissions, the receiving radio node may attempt to soft-combine and decode the repeated transmissions of the data block carried, in downlink examples, over NB-PDSCH or over the PUSCH in uplink transmission examples. Though alternative embodiments are contemplated by the present disclosure, these repeated data block transmissions may be transmitted over an entire available system frequency bandwidth.

Alternatively or additionally, the transmissions may be performed in a half-duplex manner to accommodate the limited communication capabilities of some IoT UEs. Accordingly, when a wireless communication device is receiving or transmitting data on the NB-PDSCH or NB-PUSCH, it will not simultaneously decode the NB-PDCCH. As a result, it is heretofore not possible for the eNB to provide DCI messages to the UE while data repetition reception/transmission is ongoing. Hence, such control information may be transmitted to the IoT UEs of the system (e.g., via DCI messages) during the transmission gaps defined by the transmission gap pattern. In one example embodiment, for instance, during a transmission gap in a downlink repetition transmission of a data block, a UE can listen to the downlink control channel (NB-PDCCH) and may receive an uplink grant to perform a transmission (like a HARQ feedback or CSI/CQI feedback message, etc) before resuming the downlink reception (on NB-PDSCH).

As a result of the transmission gap pattern implementation of certain embodiments herein, time and frequency resources are freed for communication of control information and data between the radio network nodes and all communication devices of an NB-IoT system. Consequently, increased system capacity, reduced latency and interference, and lower device power consumption can be realized in NB IoT devices and in the system as a whole.

In the NB-IoT context and others, therefore, some embodiments herein generally configure UEs with a gap pattern which dynamically can be turned on/off. By such gap patterns, it will be possible to give multiple UEs access to the system in a time-division multiplexing (TDM) manner. For example, a UE in deep coverage can be interleaved with UEs in good coverage. Such gaps are useful irrespective of whether FDM will be adopted by 3GPP for NB IoT as more (than 12) UEs can be given access to the system over a time period.

Furthermore, the gap configuration may be divided into two main types: dormant gaps and active gaps. In some embodiments, the UE can sleep and save power in dormant gaps. In active gaps, the UE may listen to (receive and decode) the PDCCH and follow eNB control commands. The two types can be combined. e.g., a gap pattern may consist of a mixture of types.

The gap configurations are activated through DCI messages in some embodiments. Although in another aspect, the gap configuration activation can be part of broadcasted system information and applicable to specific coverage enhancement (CE) levels only.

Figure 11:
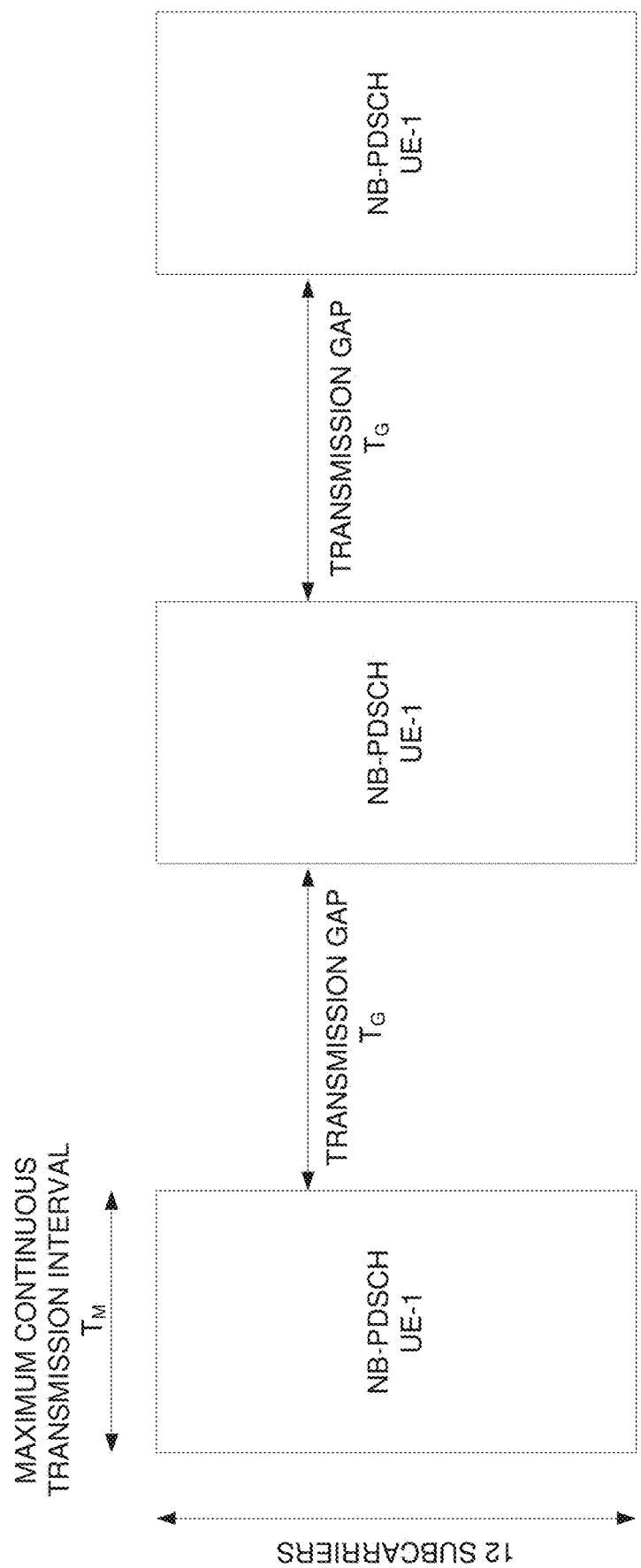
FIG. 11 is a diagram illustrating a transmission gap pattern according to some embodiments.

Some embodiments introduce these gaps with the aim to prevent DL/UL PRB of NB IoT from being blocked out during a long continuous communication period (e.g., 100's of subframes) with a UE in poor coverage. During a long NB-PDSCH transmission to a coverage-limited UE, for example, transmission gaps are introduced to allow the eNB scheduler to serve other UEs. FIG. 11 illustrates one example.

As shown in FIG. 11, transmission gaps are introduced during a long NB-PDSCH transmission to a coverage limited UE-1. The NB-PDSCH transmission is subject to a maximum continuous transmission interval TM, after which a transmission gap with duration TG is inserted. As long as, such a transmission gap solution can preserve the same amount of resources, on average, as serving other UEs based on a frequency division multiplexing solution whereby during one UE's NB-PDSCH transmission on N1 of the 12 available subcarriers, the scheduler may serve NB-PDSCH or NB-PDCCH to other UEs using the remaining portion 12—N1 of subcarriers. Yet the transmission gap approach is able to do so without introducing complexity to the NB PDCCH search space, as is the case for such an FDM solution (i.e., the search space configuration and the NB-PDCCH configuration will depend on the number of subcarriers available for NB-PDCCH). In this regard, it is desirable that NB-PDCCH be configured for 12 subcarriers in all cases.

Using the transmission gap solution and time-division multiplexing (TDM) principle for NB-PDSCH allows NB-IoT to keep the basic scheduling unit in frequency as 12 subcarriers, same as LTE. It further simplifies the configuration of NB-PDCCH since NB-PDCCH will then be configured always based on 12 subcarriers.

In other embodiments herein, downlink transmission gaps are introduced during a downlink assignment. In this case, a UE can listen to the downlink control channel (NB-PDCCH) and get an uplink grant to send something (like a HARQ feedback or something else like CSI/CQI etc) before resuming the downlink reception (on NB-PDSCH).

Despite explanation in the context of NB-IoT in some embodiments, it will be appreciated that the techniques may be applied to other wireless networks, as well as to successors of the E-UTRAN. Thus, references herein to signals using terminology from the 3GPP standards for LTE should be understood to apply more generally to signals having similar characteristics and/or purposes, in other networks.

While various embodiments herein have been described in the context of a data block transmission that comprises transmission of a data block as well as one or more repetitions of that data block, the embodiments herein extend to other types of data block transmissions as well. Generally, therefore, the transmission gaps may interrupt or otherwise create gaps in the transmission of a data block.

A radio network node 10 herein is any type of network node (e.g., a base station) capable of communicating with another node over radio signals. A wireless communication device 12 is any type device capable of communicating with a radio network node 10 over radio signals. A wireless communication device 12 may therefore refer to a machine-to-machine (M2M) device, a machine-type communications (MTC) device, a NB-IoT device, etc. The wireless device may also be a UE, however it should be noted that the UE does not necessarily have a "user" in the sense of an individual person owning and/or operating the device. A wireless device may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

In an IOT scenario, a wireless communication device as described herein may be, or may be comprised in, a machine or device that performs monitoring or measurements, and transmits the results of such monitoring measurements to another device or a network. Particular examples of such machines are power meters, industrial machinery, or home or personal appliances. e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

Note that a transmitting radio node (e.g., a user equipment or a base station) as described above may perform the processing herein by implementing any functional means or units. In one embodiment, for example, the transmitting radio node comprises respective circuits configured to perform the steps shown in FIGS. 2A. 3A, and/or 7. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more microprocessors, carries out the techniques described herein.

Figure 12B:
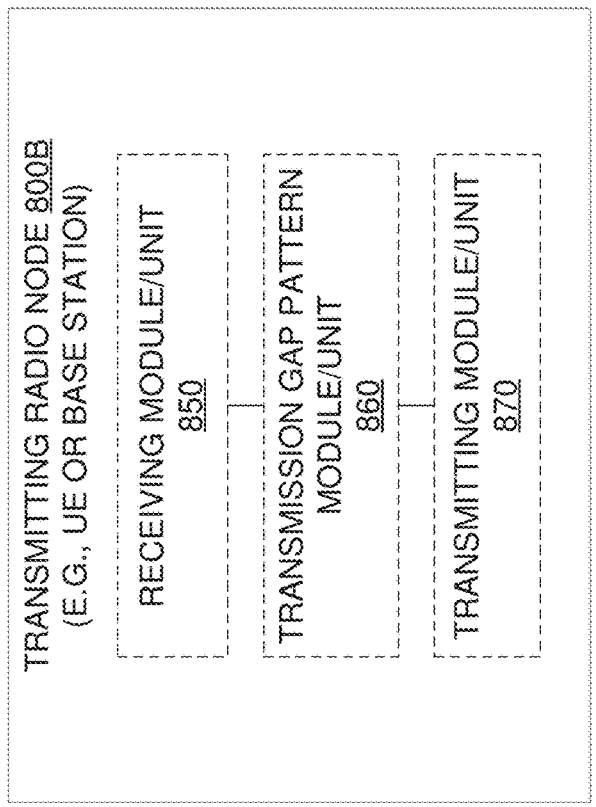
FIG. 12B is a block diagram of a transmitting radio node according to one or more other embodiments.
Figure 12A:
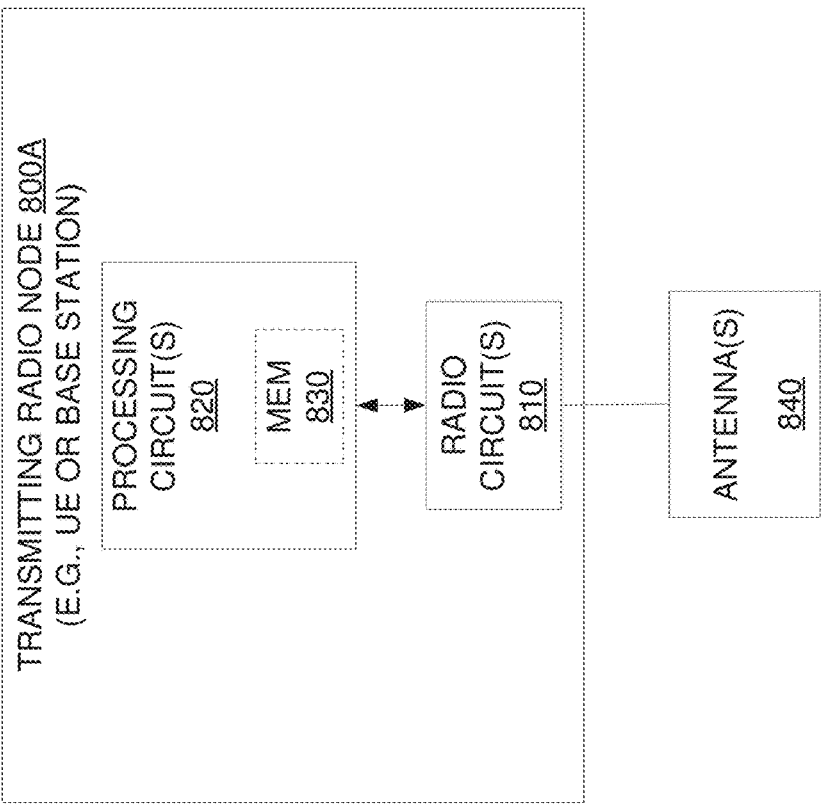
FIG. 12A is a block diagram of a transmitting radio node according to one or more embodiments.

FIG. 12A illustrates additional details of a transmitting radio node 800A in accordance with one or more embodiments. As shown, the transmitting radio node 800A includes one or more processing circuits 820 and one or more radio circuits 810. The one or more radio circuits 810 are configured to transmit via one or more antennas 840. The one or more processing circuits 820 are configured to perform processing described above. e.g., in FIGS. 2A, 3A, and/or 7, such as by executing instructions stored in memory 830. The one or more processing circuits 820 in this regard may implement certain functional means or units.

FIG. 12B in this regard illustrates additional details of a transmitting radio node 800B in accordance with one or more other embodiments. Specifically, the transmitting radio node 800B may include a receiving module/unit 850, a transmission gap pattern module or unit 860, and/or a transmitting module or unit 870. The transmitting module or unit 870 may be for transmitting a transmission 6 with transmission gaps therein as described above, e.g., by transmitting a data block and one or more repetitions of the data block. The transmission gap pattern module or unit 860 may be for determining a transmission gap pattern as described above. Where the transmitting radio node 800B also functions as a receiving radio node in combined embodiments, the receiving unit or module 850 may be for receiving a transmission 6 with transmission gaps therein as described above. The receiving unit or module 850 may alternatively or additionally be for receiving one or more signals (e.g. control signals) during transmission gaps. One or more of these modules or units may be implemented by the one or more processing circuits 820 in FIG. 12A.

Also, the receiving radio node (e.g., a user equipment or a base station) as described above may perform the processing herein by implementing any functional means or units. In one embodiment, for example, the receiving radio node comprises respective circuits configured to perform the steps shown in FIGS. 2B. 3B, and/or 8. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more microprocessors, carries out the techniques described herein.

Figure 13B:
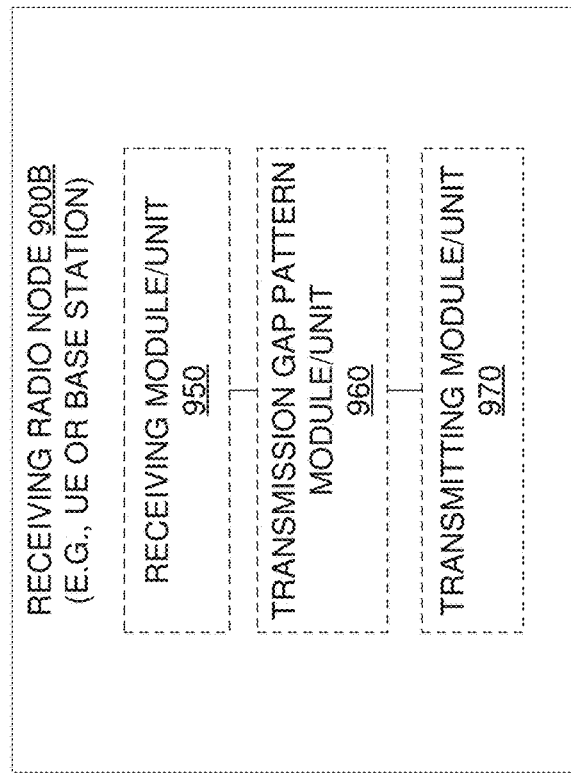
FIG. 13B is a block diagram of a receiving radio node according to one or more other embodiments.
Figure 13A:
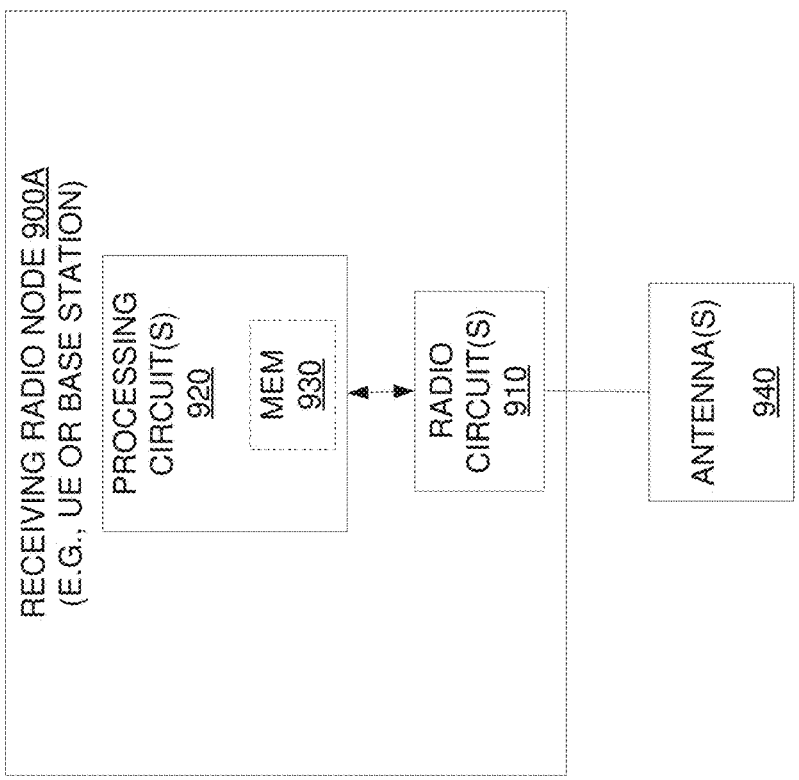
FIG. 13A is a block diagram of a receiving radio node according to one or more embodiments.

FIG. 13A illustrates additional details of a receiving radio node 900A in accordance with one or more embodiments. As shown, the receiving radio node 900A includes one or more processing circuits 920 and one or more radio circuits 910. The one or more radio circuits 910 are configured to receive via one or more antennas 940. The one or more processing circuits 920 are configured to perform processing described above. e.g., implementing the steps of FIG. 2B, 3B, and/or 8, such as by executing instructions stored in memory 930. The one or more processing circuits 920 in this regard may implement certain functional means or units.

FIG. 13B in this regard illustrates additional details of a receiving radio node 900B in accordance with one or more other embodiments. Specifically, the receiving radio node 900B may include a receiving module/unit 950, a transmission gap pattern module or unit 960, and/or a transmitting module or unit 970. The receiving module or unit 950 may be for receiving a transmission 6 with transmission gaps therein as described above, e.g., by receiving a data block and one or more repetitions of the data block. The transmission gap pattern module or unit 960 may be for determining a transmission gap pattern as described above. Where the receiving radio node 900B also functions as a transmitting radio node in combined embodiments, the transmitting unit or module 970 may be for transmitting a transmission 6 with transmission gaps therein as described above. The transmitting unit or module 970 may alternatively or additionally be for transmitting one or more signals (e.g. control signals or data blocks) during transmission gaps. One or more of these modules or units may be implemented by the one or more processing circuits 920 in FIG. 13A.

Figure 15:
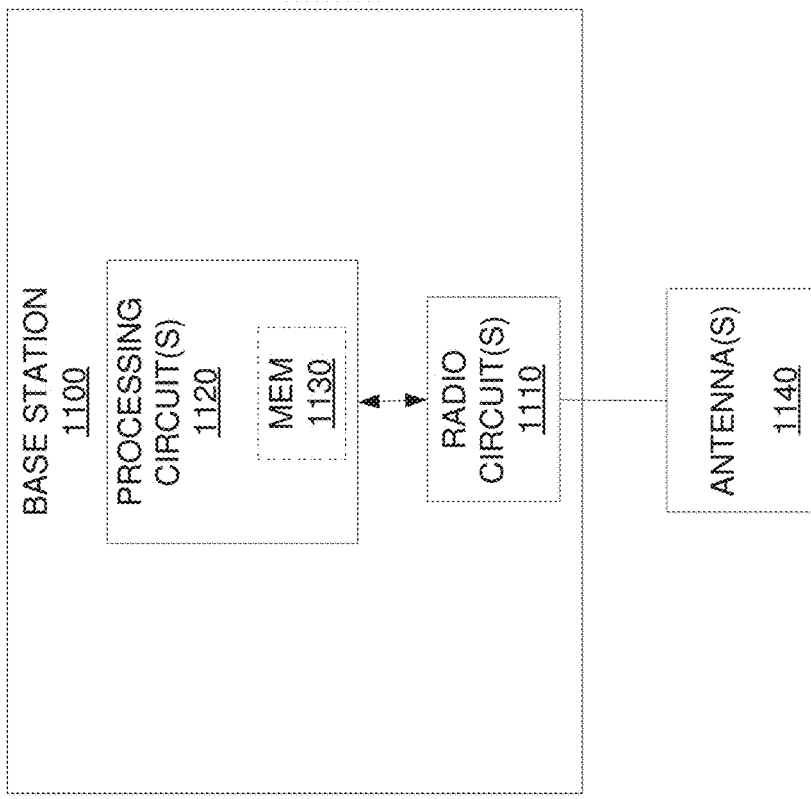
FIG. 15 is a block diagram of a base station according to one or more other embodiments.
Figure 14:
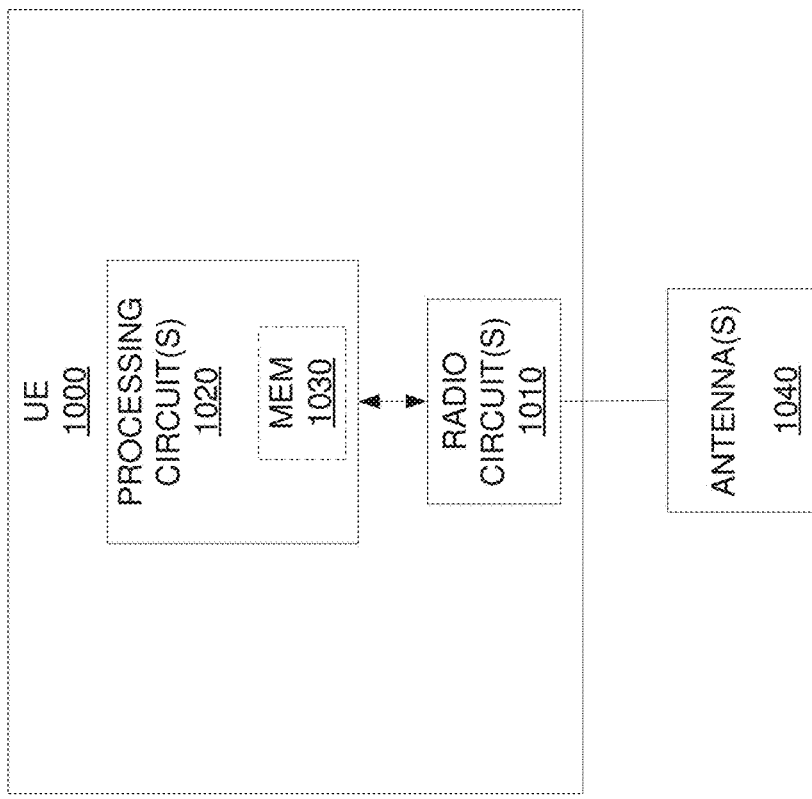
FIG. 14 is a block diagram of a user equipment according to one or more embodiments.

Accordingly, in view of the example radio nodes above. FIGS. 14-15 illustrate a user equipment (UE) 1000 and a base station (e.g., eNB) 1100 according to some embodiments.

As shown in FIG. 14, a UE 1000 may include one or more processing circuits 1020 and one or more radio circuits 1010. The one or more radio circuits 1010 may be configured to transmit and/or receive radio signal(s) via one or more antennas 1040 that may be internal and/or external to the UE 1000. The one or more processing circuits 1020 are configured to perform processing described above. e.g., implementing the steps of FIG. 2A. 3B, 7, and/or 8, such as by executing instructions stored in memory 1030.

As shown in FIG. 15, a base station (e.g., eNB) 1100 may include one or more processing circuits 1120 and one or more radio circuits 1110. The one or more radio circuits 1110 may be configured to transmit and/or receive radio signal(s) via one or more antennas 1140 that may be internal and/or external to the base station 1100. The one or more processing circuits 1120 are configured to perform processing described above, e.g., implementing the steps of FIGS. 2B, 3A, 7, and/or 8, such as by executing instructions stored in memory 1130.

Those skilled in the art will also appreciate that embodiments herein further include corresponding computer programs.

A computer program comprises instructions which, when executed on at least one processor of a node, cause the node to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

Those skilled in the art will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A user equipment configured for use in a wireless communication system, the user equipment comprising:
   one or more radio circuits; and
   one or more processing circuits configured to:
      receive from a base station, via the one or more radio circuits of the user equipment, one or more configuration messages that indicate a pattern of downlink transmission gaps in time, wherein the downlink transmission claps include one or more active claps and one or more passive gaps; and
      receive from the base station, via the one or more radio circuits of the user equipment, a scheduled downlink transmission that comprises a downlink data block and one or more repetitions of the downlink data block;
   wherein the one or more processing circuits are configured to receive the scheduled downlink transmission from the base station in a half duplex manner and over an entire system bandwidth of the wireless communication system.

2. The user equipment of claim 1, wherein the one or more processing circuits are further configured to monitor for control information from the base station during each of the one or more active gaps.

3. The user equipment of claim 1, wherein the one or more processing circuits are further configured to operate in a sleep state during each of the one or more passive gaps.

4. The user equipment of claim 1, wherein the one or more processing circuits are further configured to receive repetitions of the downlink data block with downlink transmission gaps therebetween according to the indicated pattern.

5. The user equipment of claim 1, wherein the one or more processing circuits are further configured to receive, via the one or more radio circuits of the user equipment, a scheduling message that indicates scheduling of the scheduled downlink transmission.

6. The user equipment of claim 1, wherein the one or more configuration messages include one or more of:
   information that is usable to determine a duration of each downlink transmission gap; and
   information indicating a periodicity of the downlink transmission gaps.

7. A method performed by a user equipment configured for use in a wireless communication system, the method comprising:
   receiving, from a base station, one or more configuration messages that indicate a pattern of downlink transmission gaps in time, wherein the downlink transmission gaps include one or more active gaps and one or more passive gaps; and
   receiving, from the base station, a scheduled downlink transmission that comprises a downlink data block and one or more repetitions of the downlink data block, wherein the receiving the scheduled downlink transmission comprises receiving the scheduled downlink transmission from the base station in a half duplex manner and over an entire system bandwidth of the wireless communication system.

8. The method of claim 7, further comprising monitoring for control information from the base station during each of the one or more active gaps.

9. The method of claim 7, further comprising operating in a sleep state during each of the one or more passive gaps.

10. The method of claim 7, further comprising receiving repetitions of the downlink data block with downlink transmission gaps therebetween according to the indicated pattern.

11. The method of claim 7, further comprising receiving a scheduling message that indicates scheduling of the scheduled downlink transmission.

12. The method of claim 7, wherein the one or more configuration messages include one or more of:
   information that is usable to determine a duration of each downlink transmission gap; and
   information indicating a periodicity of the downlink transmission gaps.

13. A non-transitory computer-readable storage medium on which is stored instructions that, when executed by one or more processors of a user equipment configured for use in a wireless communication system, cause the user equipment to:
   receive, from a base station, one or more configuration messages that indicate a pattern of downlink transmission gaps in time, wherein the downlink transmission gaps include one or more active gaps and one or more passive gaps; and
   receive, from the base station, a scheduled downlink transmission that comprises a downlink data block and one or more repetitions of the downlink data block, by receiving the scheduled downlink transmission from the base station in a half duplex manner and over an entire system bandwidth of the wireless communication system.

14. The non-transitory computer-readable storage medium of claim 13, wherein the instructions, when executed by the one or more processors of the user equipment, cause the user equipment to monitor for control information from the base station during each of the one or more active gaps.

15. The non-transitory computer-readable storage medium of claim 13, wherein the instructions, when executed by the one or more processors of the user equipment, cause the user equipment to operate in a sleep state during each of the one or more passive gaps.

16. The non-transitory computer-readable storage medium of claim 13, wherein the instructions, when executed by the one or more processors of the user equipment, cause the user equipment to receive repetitions of the downlink data block with downlink transmission gaps therebetween according to the indicated pattern.

17. The non-transitory computer-readable storage medium of claim 13, wherein the instructions, when executed by the one or more processors of the user equipment, cause the user equipment to receive a scheduling message that indicates scheduling of the scheduled downlink transmission.

18. The non-transitory computer-readable storage medium of claim 13, wherein the one or more configuration messages include one or more of:
- information that is usable to determine a duration of each downlink transmission gap; and
- information indicating a periodicity of the downlink transmission gaps.

\* \* \* \* \*